United States Patent [19]

Lumsden

[11] 3,922,492

[45] Nov. 25, 1975

[54] REMOTE METER READING TRANSPONDER

[76] Inventor: James Ray Lumsden, 107 Grandin Village, St. Albert, Alberta, Canada

[22] Filed: Mar. 18, 1974

[21] Appl. No.: 452,287

[52] U.S. Cl. .............................. 179/2 A; 340/152 T

[51] Int. Cl.[2] .............................................. H04M 11/00

[58] Field of Search ..... 179/2 A; 340/147 R, 147 F, 340/150, 151, 163, 152 T

[56] References Cited

UNITED STATES PATENTS

| | | | |
|---|---|---|---|
| 3,553,376 | 1/1971 | Bogaart ............................... | 179/2 A |
| 3,815,093 | 6/1974 | Caretto ............................ | 340/152 T |
| 3,842,206 | 10/1974 | Barsellotti ........................... | 179/2 A |

*Primary Examiner*—William C. Cooper
*Assistant Examiner*—Joseph Popek
*Attorney, Agent, or Firm*—Larson, Taylor and Hinds

[57] ABSTRACT

A system for remotely reading, storing and transmitting the current reading of a plurality of utility meters to a central computer. Each remote location using a utility is fitted with a transponder which is connected to the various utility meters. The transponders are capable of receiving pulses from sending units in the utility meters and storing these pulses. The computer can connect itself with a particular transponder by sending an interrogation code decodable only by that transponder. If the correct interrogation code is received twice within a predetermined time period the transponder is activated and transmits its stored information to the computer.

28 Claims, 13 Drawing Figures

REMOTE METER READING TRANSPONDER

INTRODUCTION AND GENERAL DISCUSSION

The present invention relates to a remote meter reading system. In particular, the present invention relates to a remote transponder used in the system.

Increasing labour costs have made it desirable to automatically read and record the consumption of various utilities without sending personnel to the remote location using the utility. The present invention utilizes telephone lines for connecting a plurality of transponders at a plurality of remote locations to a central station. As a result, all the equipment used in the system must be compatible with the telephone company's requirements for line use. For example, all the equipment connected to the telephone line must present a balanced load of a correct impedance.

The system according to the present invention uses a computer located at a central station. The computer interfaces with an automatic dialing device which connects the remote station via a telephone exchange. The transponder at that remote station which stores information relating to the current consumption of the utility or utilities in question is coupled directly to the telephone line in parallel with the customers telephone. It is possible for the computer to be connected to several remote transponders simultaneously since party lines exist in many rural localities. However, the computer is able to discriminate a particular transponder on the party line because in addition to dialing the correct telephone number, the computer sends a binary code to all of the transponders on the party line. Each transponder is hard wired to be activated by a particular binary code and as a result, only that transponder with a hard wired code indentical to the code sent by the computer is activated. As a result it is possible to connect a plurality of transponders to the same telephone line.

It is an important feature of the present invention that the transponder not be activated by spurious signals appearing on the line, or by signals generated via the voice communication between customers using the telephone lines to which the transponder is connected. In order to insure that the transponder is not falsely triggered by such spurious signals the computer doubly interrogates the transponder. The computer, first arranges for the dialing of the appropriate telephone number and once the line connecting the computer to the transponder in question has been accessed and has been found not to be busy, the computer sends a binary code distinguishable only by the transponder in question. The binary code, if received correctly by the transponder, puts the transponder into a ready state. The same code must be sent by the computer to the transponder a second time before the transponder transmits its recorded information back to the computer. Since the binary code must be received twice by the transponder within a predetermined time period the probability of spurious signals inadvertently activating the transponder becomes extremely small and, for all practical purposes can be considered zero.

Both the transponder and the computer handle binary coded data signals. These signals consist of a timed sequence of "high" and "low" logic level voltages corresponding to "1" and "0" quantities of the binary code. These binary coded signals cannot be sent in their direct current form through the telephone system with any degree of reliability. The low logic level voltage pulses of the binary code must be converted into frequency bursts for transmission through the telephone line. Each transponder according to the present invention includes a novel modem which receives the binary signal from the telephone line in a form which is transmittable through the telephone line and converts it back into a form usable by a computer and, of course, the transponder itself.

Prior art modem units employ narrow band tuned filter networks to reduce noise which mixes with the digital signal as it is being carried by the telephone line. Since the transponder according to the present invention is designed to be trouble free without major service for approximately 10 years, such narrow band tuned circuits can not be used due to their habit of detuning as components age. The modem units employed in the present invention are untuned broad band stages. Moderate noise is reduced in the modem of the present invention by employing a series arrangement of operational amplifiers and clipping diodes which are biased to manipulate a relatively noise free portion of the frequency burst portion of the digital signal. Large noise levels which are sufficient to completely obliterate the signal cannot accidentally activate the transponder due to its novel double interrogation system.

Each meter measuring the consumption of a utility has a least significant digit wheel or pointer which rotates through one complete revolution every time a unit of the utility in question is consumed. For example, if the utility is electric power, the least significant digit wheel will rotate through one turn for each kilowatt hour of power consumed. The present invention stores and transmits to the central computer the number of revolutions of the least significant digit wheel of each meter being monitored. One embodiment of the present invention uses a magnet which is affixed to the least significant digit wheel and which activates a magnetic reed switch to send a pulse to the transponder. One pulse is received for each rotation of the wheel. The meter switch is connected to the transponder via a 750 millisecond time delay so that noise transients and static charges will not inadvertently increment counters in the transponder since such noise usually cannot produce a signal for such a time period. A second embodiment ensures a clean pulse entering the transponder. The meter switch and time delay activate a one shot circuit element which in turn feeds a well defined pulse into the transponder. Both of these embodiments employ a magnetic reed switch to either directly or indirectly pulse storage counters in the transponder. Reed switches are mechanical devices and are subject to failure with time and are subject to contact ring or bounce. As a result, the present invention contemplates a third embodiment of sending unit for the transponder. The third embodiment empoloys a photoconductor. A light beam is reflected from a reflective portion of the least significant digit wheel or a reflective pointer and activates a photoconductor. The signal thereby produced can be fed to storage counters in the transponder by way of a time delay circuit or a time delay circuit and a one shot circuit element. The photoconductor embodiment can use for example, a GaP red L.E.D. photoconductor which has extremely good reliability with time and thereby increases the reliability of the overall system. In addition, any switch contact ring or bounce is eliminated since no moving parts are present in this system. This provides a more cleanly defined signal pulse and the one shot circuit element can be eliminated from the circuit if desired, thereby improving the system from aneconomic viewpoint.

Each utility meter sends pulses to a group of four decade counters. As a result, the numbers from 0 to 9,999 can be stored for each utility corresponding to the number of rotations of the least significant digit wheel and therefore to the number of units of consumption of each utility. It should be understood that the present invention is not limited to the storage and transmission of numbers within this range. However, for the present application it has been found that it is not necessary to store larger numbers. The rates of consumption of the utility and the time interval between meter readings preclude the situation where the count could increment more that 9,999 times. The computer at the central location is programmed to handle the situation where one reading is, for example, 9,950 and the next reading is 0050. Since four decade counters are used for each utility and the present invention contemplates the monitor of three utilities, 12 decade counters are used in all to store the pulses of the three utilities. The output of the twelve decade counters is fed to four multiplexing units. Each decade counter has four outputs corresponding to the number 1, 2, 4 and 8. Combinations of signals appearing on these four output lines define the numbers 0 through 9. The 1, 2, 4 and 8 outputs of the first decade counter are fed to the first input of the first, second, third and fourth multiplexers respectively. As a result, the first input of the four multiplexers have the "units" digit of the first utility meter currently stored thereon. The second decade counter representing the "tens" digit of the first utility has its outputs respectively connected to the second input of each of the four multiplexers.

The counters and multiplexers are connected in such a way that the first through fourth inputs to the multiplexers have signals impressed thereon which represent the current reading of the "units", "tens", "hundreds" and "thousands" digits of the first utility. In an identical manner, the fifth through eighth inputs to the multiplexers have signals impressed thereon which represent the current reading of the second utility, and the ninth through twelfth inputs have signals impressed thereon which represent the current reading of the third utility.

When a transponder has been accessed by the central computer a clock pulse, via a control circuit, activates yet another decade counter which controls the four multiplexer outputs. When the clock pulse increments this counter to 1 the output of each multiplexer is connected to the first input of each multiplexer respectively. The output of the four multiplexers is fed to a RX/TX control chip. The information appearing on the first inputs of the four multiplexers is fed in a parallel arrangement into the RX/TX control chip. The information appearing on the first input of each multiplexer is temporarily stored in a first or buffer register within the control chip. As soon as the information has been stored in this buffer register the buffer register empties its information into a second register known as a transmit register. When the first or buffer register is emptied the RX/TX control chip sends a signal to the control circuit allowing the next clock pulse to increment the decade counter controlling the multiplexers so that the second input of each multiplexer is connected to the respective multiplexer output. As a result, the information appearing on the second input of each of the multiplexers is fed into the buffer register of the RX/TX control chip. The RX/TX control chip adds a start bit, parity bit and stop bits to the information contained in the second register and transmits the entire bundle of coded information out of the control chip to the transmit modem. As soon as the second register has emptied, information contained in the first register is emptied into the second register and a signal is sent to the control circuit to again increment the decade counter controlling the multiplexers. Because the RX/TX control chip contains a register and a buffer register it can be seen that a parallel operation takes place in the transponders transmit circuitry. As a result, the time required to transmit all of the information stored in the transponder to the computer at the central location is considerably reduced. The decade counter controlling the multiplexers continues to increment through all number 1 through 12 and, as a result, the ones, tens, hundreds and thousands digits of each of the 12 binary decimal counters is transmitted in a serial manner from the transponder to the central computer. Every time the RX/TX control chip completes its transmission of a binary code train consisting of a start bit, 4 information bits, 4 0 bits, a parity bit and two stop bits, it outputs an end of transmission pulse. When the counter controlling the four multiplexers increments to 12 a signal is fed from the counter to one input of a NAND gate. A second input of the NAND gate is connected to the RX/TX control chip so that the end of transmission pulse activates the NAND gate when the counter is in the 12 position. The NAND gate which forms part of the control circuit, when activated, resets the transponder so that it can again be controlled or activated by the central computer.

STATEMENT OF THE INVENTION

In accordance with the present invention there is provided a system for remotely reading utility meters comprising: a centrally located unit comprising: a digital computer having a first storage unit for storing a plurality of binary interrogation code trains, and second storage unit for receiving binary code trains and a control unit; an automatic telephone dialing unit, controllable by said control unit; a first computer/telephone interface, said interface connecting said computer to said automatic dialing unit, said interface also processing codes compatible with said computer into codes compatible with said automatic dialing unit, said interface also processing codes compatible with said automatic dialing units into codes compatible with said computer; a plurality of remotely located transponders, each transponder being comprised of: a second computer/telephone interface, said second interface connecting said transponder to said computer via a telephone line, a central exchange, said automatic dialing unit and said first interface, said second interface adapting codes from said telephone lines for use in said transponder and adapting codes from said transponder for transmission over said telephone line; a decoder, said decoder being connected to said second interface and being adapted to respond to a particular one of said plurality of binary interrogation code trains, a storage unit connected to at least one sending unit, said sending unit being connected to a utility meter, said storage unit storing in binary coded decimal from the current reading of each utility meter thereto connected; a transmitter, said transmitter being connected to said storage unit and also connected to said second computer/telephone interface; a control circuit connected to said decoder, said control circuit switching from a first state to a second state upon receipt of said particular one of said binary interrogation code trains, said control circuit switching from said second state to a third state upon receipt of a second time of said particular one of said binary interrogation code trains within a predetermined time period, said control circuit switching from said second state to said first state if said particular one of said binary interrogation code trains is not received within said predetermined time period, said control circuit, when in said third state, controlling said transmitter to transmit said binary code trains from said storage units to said second storage units of said computer, said control circuit switching from said third state to said first state upon the termination of said transmission.

INTRODUCTION OF THE DRAWINGS

The present invention will be described in detail hereinbelow with the aid of the accompanying drawings in which:

FIG. 1 is a block diagram of a particular embodiment of the overall system according to the present invention;

FIGS. 2*a*, 2*b* and 2*c* are schematic diagrams of various embodiments of sending units which can be used in conjunction with the system according to the present invention;

DETAILED DESCRIPTION

Figure 1:
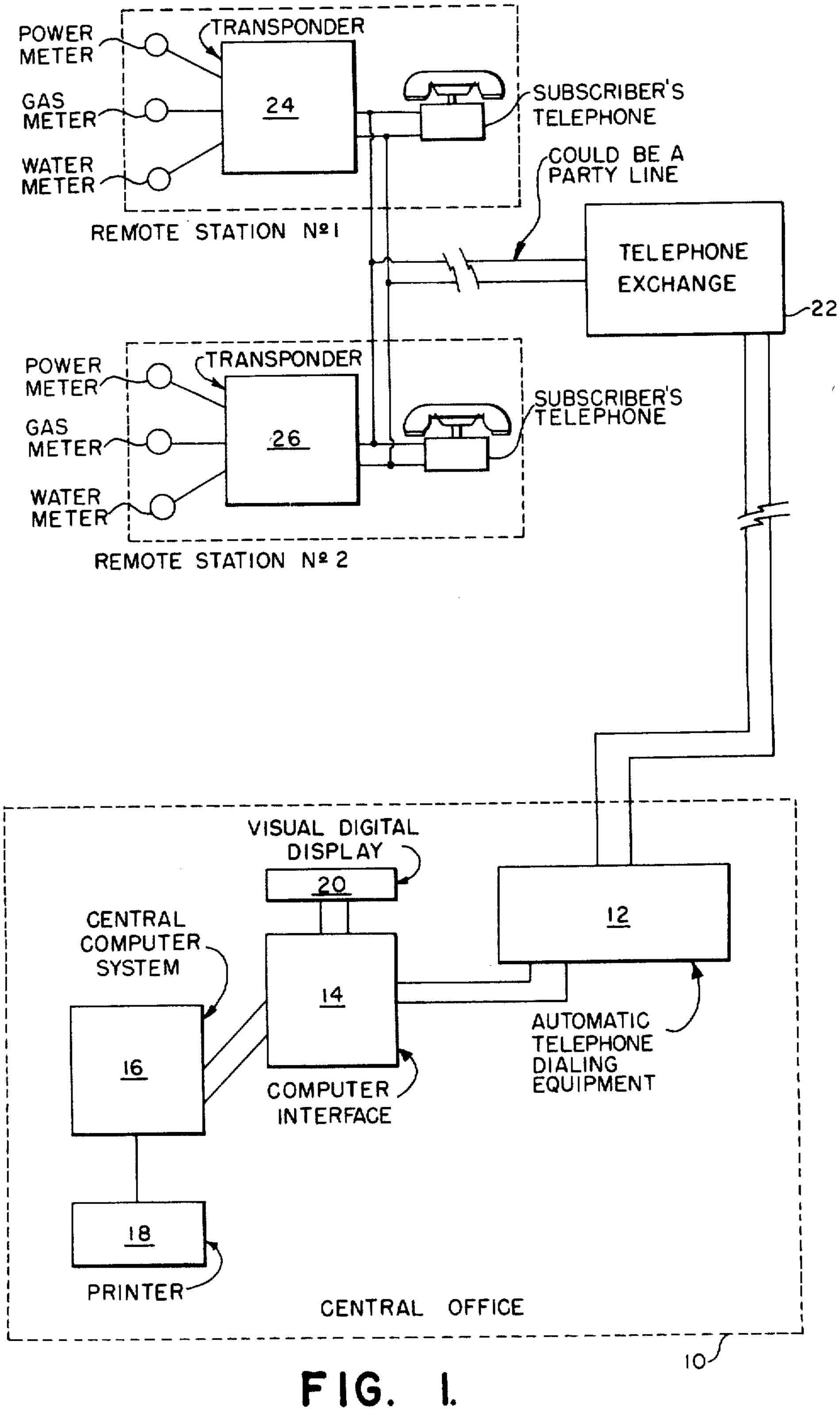

FIG. 1 is a block diagram of the overall system according to the present invention. A central office 10 contains an automatic telephone dialer 12, a computer interface 14, a computer 16, a printer 18 and a digital display 20. The computer 16 has stored in its memory the telephone numbers and the binary interrogation codes of the various transponder units of the system. The computer 16 signals the automatic dialing unit 12 to telephone the telephone number of the subscriber at, say, remote station No. 1. The automatic dialing unit 12 telephones the number of the subscriber at remote station 1 through the telephone exchange 22. The computer also controls the automatic dialing equipment 12 to inhibit the telephone ring of the subscriber's telephone. The automatic dialing unit then checks to make sure that the telephone line in question is not busy. This is done by merely sensing the voltage on the line. A voltage in the neighbourhood of 50 volts indicates that the line is not busy. However, if the voltage on the line is in the neighbourhood of 5 volts, the automatic telephone dialing equipment transmits to the computer via the computer interface 14 the fact that the telephone line is busy and the computer disengages the automatic dialer from the line. The embodiment shown in FIG. 1 shows a party line connecting remote station No. 1 and remote station No. 2 to the telephone exchange 22 and the central office 10 via a single line. As a result, remote transponders 24 and 26 are connected to the same telephone line. For the system to work, the telephone line to remote station No. 1 and remote station No. 2 must not be busy. If that telephone line is not busy, the computer sends a binary interrogation code via the computer interface and the telephone exchange 22 to both transponders 24 and 26. However, transponders 24 is hard wired to receive the particular code sent by the computer, whereas, the transponder 26 is sensative to a different binary code. If the correct binary code is received by the transponder 24 the transponder is activated from a standby state to a ready state. If the same binary code is correctly received by the transponder 24 a second time within a predetermined time period, the transponder will be activated from its ready state to a transmit state. If, on the other hand, for any reason the binary code is not received correctly a second time within the predetermined time period the transponder will automatically return to its standby state. In this way, the computer 16 located at the central office 10 can discriminate transponder 24 from transponder 26 even though they are connected by the same telephone line. Power meter 28, gas meter 30 and water meter 32 are connected to the transponder. As will be described in detail below the transponder 24 stores the current reading of the consumption of the three utilities. When the transponder is activated from its ready state to its transmit state the stored information contained in transponder 24 is converted to a signal form capable of being transmitted via a telephone line and is transmitted via the telephone line and the telephone exchange 22 to the computer innerface 14. The computer interface 14 reconverts the transmitted information into a form usable by the computer. The information is stored in the computer 16 and displayed on the visual digital display device 20. The printer 18 connected to the computer can be activated at any time to print out the information transmitted from remote station No. 1. Similarly, by using a different binary interrogation code, transponder 26 located at remote station No. 2 can be activated to transmit its stored information to the central office 10. Of course, the information stored in transponder 26 relates to the power consumption, gas consumption and water consumption at remote station No. 2. Other transponders (not shown) can be accessed by the computer merely by dialing the appropriate telephone number and sending the appropriate interrogation code in a manner described above. It is possible to connect up to 240 transponders to the same telephone party line and discriminate each one using an interrogation code size contemplated by the present invention.

Figure 2A:
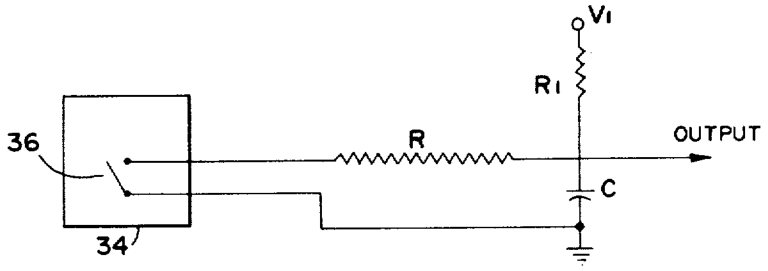

FIG. 2*a* illustrates the simplest form of a sending unit contemplated by the present invention. The rectangular box 34 represents a meter to be read. A mechanical switch 36 is activated by the least significant digit wheel in some manner, for example, by a magnet (not shown). When the normally opened switch 36 is opened, the voltage at the output will equal V1, the supply voltage. The normally opened switch 36 is closed once for every complete revolution of the least significant digit wheel of the meter 36. When the switch 36 is closed the voltage at the output drops. The rate of drop is determined by the value of resistor R and capacitor C. The action of the resistor R and the capacitor C damps out any contact bounce of the switch 36. It is possible that such a circuit, when the switch is opened would be subject to trnsient noise. However, transient noise is damped out by the arrangement of the resistor R1 and the capacitor C. The circuit shown in FIG. 2*a* provides a negative going pulse at the output terminal every time the least significant digit wheel of the meter 34 completes one revolution.

Figure 2B:
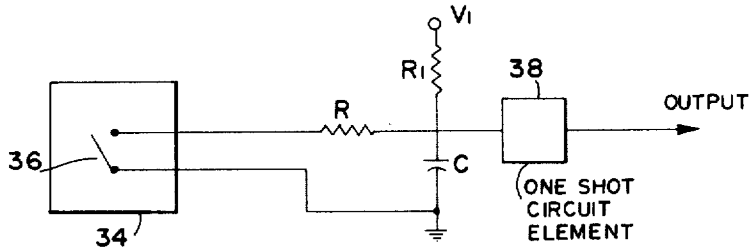

FIG. 2*b* of the drawing illustrates a second embodiment of a sending unit comtemplates by the present invention. The same reference numerals used in FIG. 2*a* are used again in FIG. 2*b* for identical elements. FIG. 2*b* employs a one shot circuit element 38 at its output. Whenever the voltage V2 drops below a predetermined threshold value the one shot circuit element is triggered and produces a well defined negative going pulse at the output terminal. This well defined negative pulse is fed to the counting portion of the transponder to be described below.

Figure 2C:
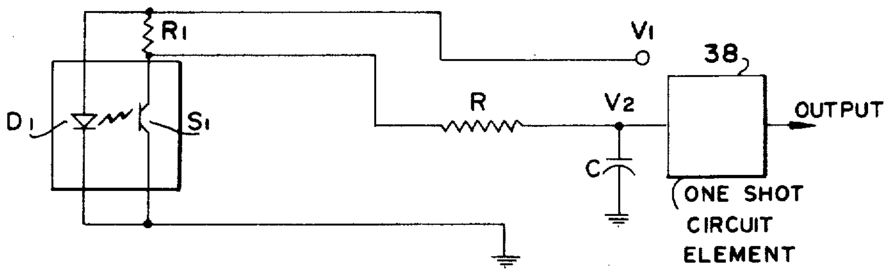

FIG. 2*c* of the drawings illustrates yet another embodiment of a sending unit comtemplated by the present invention. The light emitting diode D1 produces a light beam which is reflected from a reflective portion of the least significant digit wheel once for each revolution of the least significant digit wheel. The light reflected from the reflective portion of the least significant digit wheel activates the switching element S1 which reduces the voltage V2 appearing at the input of the one shot circuit element 38. Again, the one shot circuit element 38 produces a pulse at its output when the voltage at the input, V2, drops below a predetermined threshold value. When the switching element S1 is not activated the voltage V2 equals the supply voltage V1. Again, a resistor capacitor network is arranged in the circuit to damp the circuit from transient noise response. A fourth embodiment (not shown) is identical to the embodiment shown in FIG. 2*c* but the one shot circuit element 38 is eliminated and the output voltage V2 is fed directly to the storage element of the transponder.

The transponder itself will now be described in detail with reference to FIGS. 3, 4, 5 and 6. The physical relationship of these four figures can be determined by observing the layout shown in FIG. 10.

Figure 3:
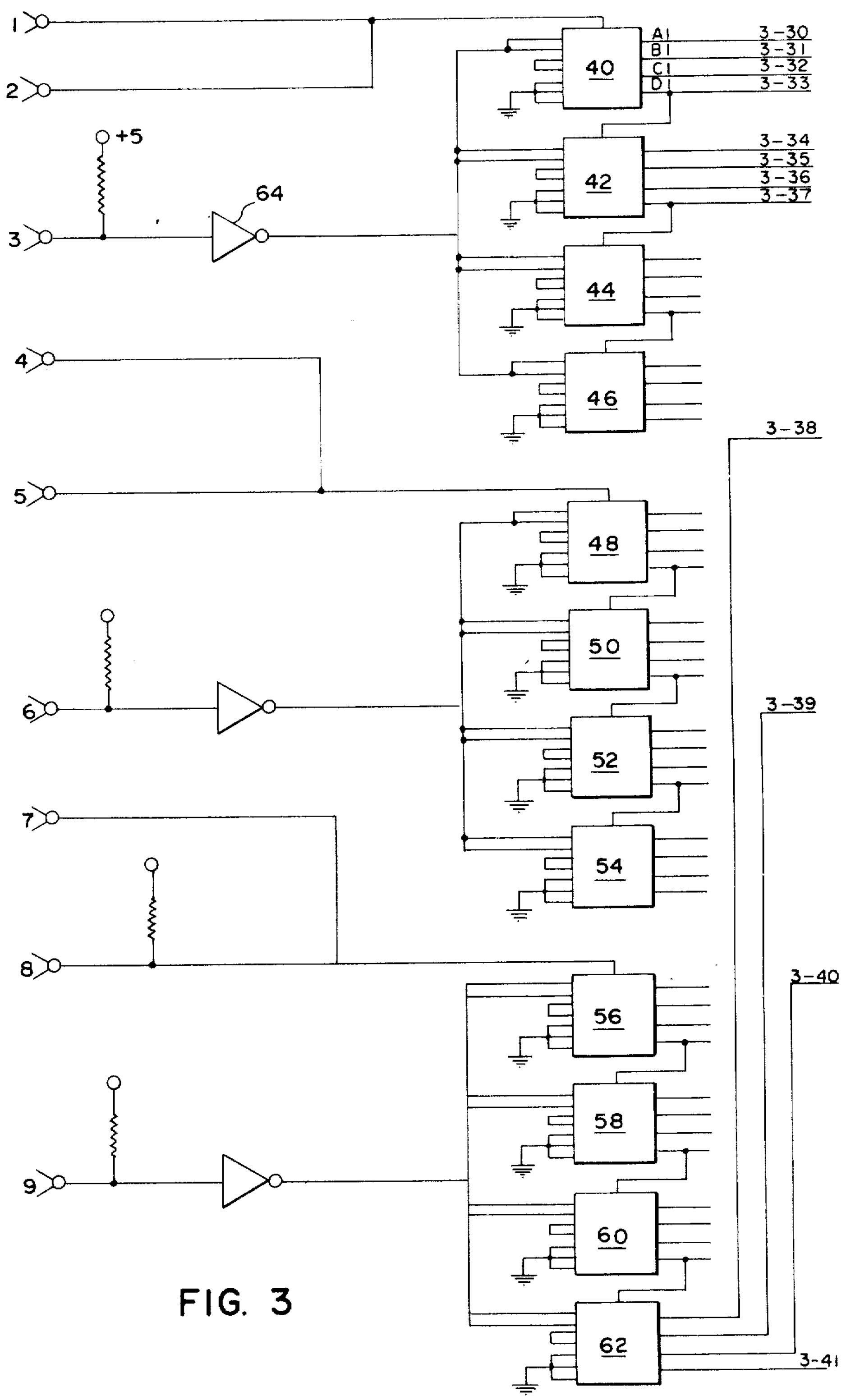
FIG. 3, 4, 5 and 6 is a schematic diagram of a particular embodiment of a transponder using the system shown in FIG. 1.

FIG. 3 shows nine input terminals numbered 1 through 9. Input terminals 1, 2 and 3 control the operation of four decade counters numbered 40, 42, 44 and 46. As mentioned above, the particular embodiment shown in FIGS. 3 through 6 store and transmit information concerning three utilities. Counters 40, 42, 44 and 46 store the current reading of one of the utilities, for example the power utility. Similarly, input terminals 4, 5 and 6 and counters 48, 50, 52 and 54 handle a second utility, for example gas. Again, input terminals 7, 8 and 9 and counters 56, 58, 60 and 62 handle the third utility, for example water. The system will be described in detail for one of the utilities with the other two being handled in a identical fashion. Input terminal 1 is connected to the sending unit of the first utility, the power utility. Each time the least significant digit wheel of the power meter rotates through 1 revolution a low level voltage pulse is fed to the counter 40. The counters 40, 42, 44 and 46 are cascaded together and as a result can store numbers from 0 to 9,999. The counter 40 handles the units digit of the number, the counter 42 handles the tens digit of the number, the counter 44 handles the hundreds digit of the number and the counter 46 handles the thousands digit of the number to be stored. Each counter has at its right side four output lines. Counter 40 has its four output lines marked A1, B1, C1, and D1. High and low voltage levels appear on these output lines depending on the current count of the counter. The truth table appearing below shows the various logic level voltages appearing on output lines A1, B1, C1 and D1 corresponding to the decimal count of the counter. In the truth table a high logic level voltage is represented by a logical 1 and a low logic level voltage is represented by a logical 0. The counters are incremented by a low pulse level. When counter 40 has counted through to 9 line D1 has a high level logic voltage appearing thereon. The next increment resets the counter to 0 and so the high level on line D1 drops to a low level. This low level drop increments counter 42 from 0 to 1.

TRUTH TABLE FOR DECADE COUNTERS

| DECIMAL COUNT STORED | OUTPUT TERMINAL A1 | B1 | C1 | D1 |
|---|---|---|---|---|
| 0 | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |
| 8 | 0 | 0 | 0 | 1 |
| 9 | 1 | 0 | 0 | 1 |
| 10 | 0 | 0 | 0 | 0 |

The current count of the counters must be set to equal the count of the meter when the transponder is originally installed. A pulse generator (not shown) can be connected to terminal 2 and a predetermined number of pulses can be transmitted into the transponder, the number of these pulses corresponds to the count of the meter at the time of installation. This sets the current count in the transponder equal to the current count of the meter in question. If, for any reason, it is necessary to reset the counters to 0, a low level voltage pulse can be applied to terminal 3. This low level pulse is inverted by inverter 64 sending a high level voltage pulse to the reset terminal of the counters. The connection and operation of counters 48, 50, 52 and 54 are identical to those described for counters 40, 42, 44 and 46. As mentioned above, counters 43, 50, 52 and 54 handle the second utility. Counters 56, 58, 60 and 62 handle the third utility. The sending units and the counters mentioned above are supplied with rechargeable battery power so that even during a power failure the transponder continues to store utility consumption.

As has been explained, the current meter reading of the power meter, the gas meter and the water meter are stored in the counters 40, 42, 44, 46, 48, 50, 52, 54, 56, 58, 60 and 62. However, these counts are not transmitted to the computer at the central location until such time as the computer correctly interrogates the transponder. A detailed description of the transponder interrogation, control and transmit circuitry will now be described with references to FIGS. 4, 5, 6 and 7.

Figure 7:
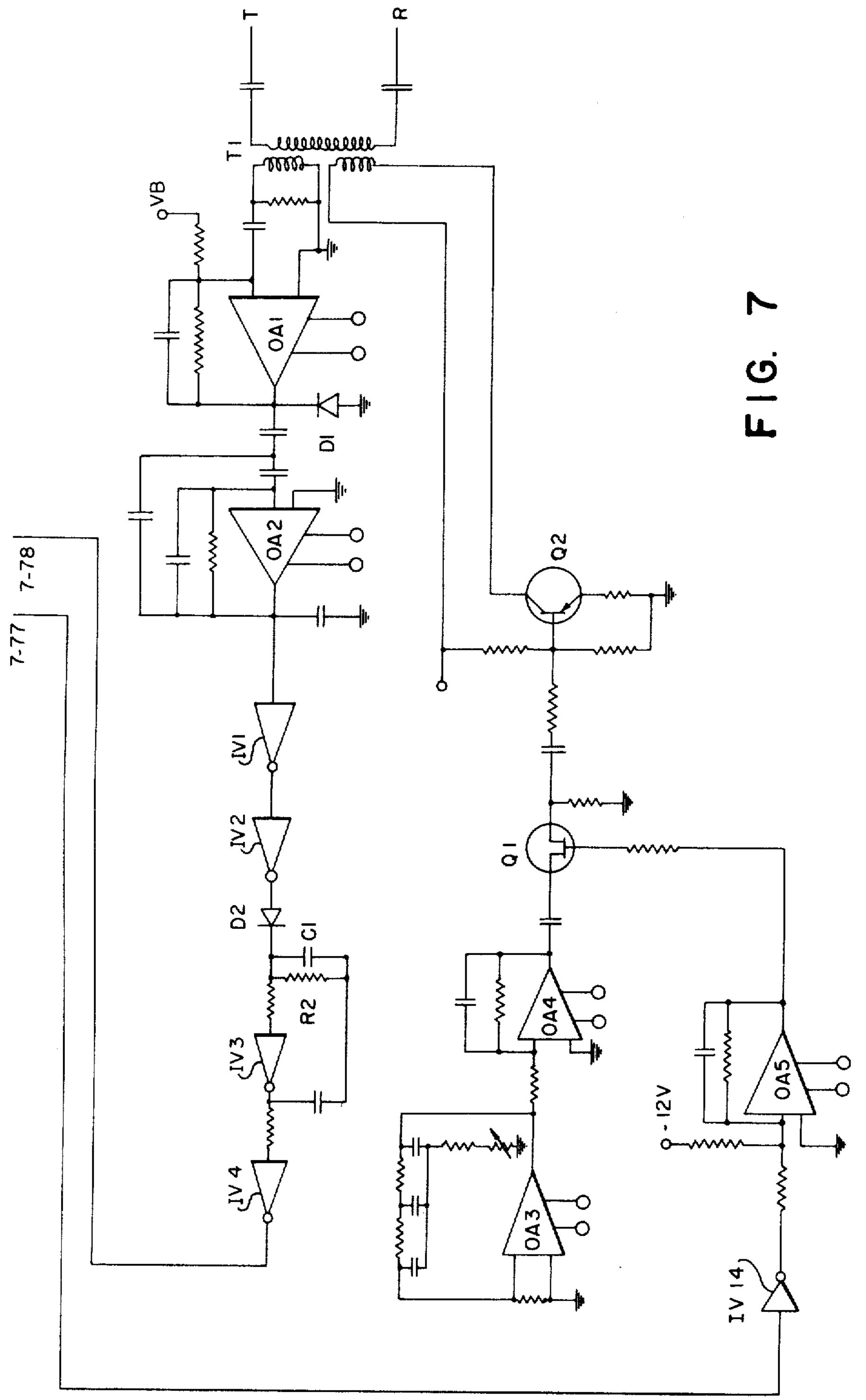
FIGS. 7, 8 and 9 are schematic diagrams of three embodiments of the transmit and receive modems which can be used with the transponder according to FIGS. 3, 4, 5 and 6.

The computer at the central exchange causes an automatic telephone dialing system to dial the number of the transponder in question. The "tip" and "ring" lines of the transponder are directly connected in parallel to the tip and ring lines of the customers telephone. The tip and ring lines for the transponder are identified as T and R and appear on the right side of FIG. 7. The computer tests to see that the customers tip and ring line is not busy. If the line is not busy, approximately 50 volts will exist thereon. Once the computer has determined that the telephone line in question is not busy, the computer sends a 12 bit binary interrogation code to the transponder. The 12 bit binary interrogation code consists of one start bit, 8 information or code bits, a parity bit and 2 stop bits. The code is comprised of 1 and 0 direct current logic level voltages. However, the direct current logic levels cannot be sent via a telephone line. They must be converted into short frequency bursts and short silent bursts on the telephone line. A logical 0 is represented by a 6.6 millisecond burst of a frequency of 2,225 hertz. The logical 1 is represented by a 6.6 millisecond duration of no frequency transmission. The input circuitry to the transponder shown in FIG. 7 is known as a modem and this circuitry converts the incoming signal from the telephone line into high and low logic level voltages used in computer circuits and in the transponder. The low level logic voltage is 0 volts and the high level logic voltage is +5 volts. Operational amplifier OA1 is a broad band amplifier capable of amplifying signals ranging in frequency from about 1,200 Hz to about 2,700 Hz. The logical 0 bursts in the code being sent by the computer to the transponder are fed to the operational amplifier OA1 via the transformer T1. Operational amplifier OA1 is biased by voltage VB so that it amplifies the frequency burst signal in an equal manner about a point fixed at approximately −0.7 volts. It has been found that the zero voltage crossing point of the burst signal is one which is fairly susceptible to noise and as a result the amplifier stage is biased away from this point. A diode D1 is connected between the output of operational amplifier OA1 and ground. The diode D1 clips the output burst signal at a level of −0.707 volts. Since the amplifier OA1 is biased to operate about −0.7 volts the diode clips away the negative going portion of the originally received signal below approximately −1.4 volts. As a results, the frequency bursts entering operational amplifier OA2 have a positive going portion of a relatively high signal level and a negative going portion that is clipped at −0.707 volts. In addition to the burst signal being susceptible to noise at its zero crossing point, noise can be induced into the signal in its transmission from the central station to the remote transponder at the voltage peaks of the frenquency burst. As a result, that portion of the frequency burst between 0 volts and −0.707 volts which has been clipped by the diode D1 is relatively noise free. It is this portion of the signal which will eventually be transformed by the modem unit into the low level logic voltage used by the control circuitry of the transponder. Operational amplifier OA2 amplifies the signal burst as modified by the diode D1 and inverts it. As a result, at the output of operational amplifier OA2 a frequency burst is present which contains both a positive and a negative going portion. The position going portion is the amplified portion of the formerly negative portion of the frequency burst clipped by the diode D1. The negative going portion of the frequency burst at the output of the operational amplifier OA2 was the formerly positive going frequency burst containing noise at its peaks which was induced into the frequency burst via its transmission through the telephone line. The inverter IV1 is sensitive only to positive going signals and produces a frequency burst at its output, shifted in phase through 180° having a voltage level of +5 volts. Inverter IV2 merely recorrects the phase relationship of the frequency burst. Diode D2 removes any negative going spikes from the frequency burst which may have penetrated through the two inverters IV1 and IV2. Capacitor C1 and resistor R2 form an intergrating network which removes the frequency burst from the signal leaving a positive going direct current pulse of a duration of 6.6 milliseconds. This positive going pulse, i.e. going from 0 volts to +5 volts is not squarely defined and can contain some noise if a great deal of noise was introduced into the frequency burst through its transmission through the telephone line. As a result, the positive going direct current pulse is fed through an inverter IV3. The output of inverter IV3 is a negative going pulse i.e. a pulse which goes from +5 volts to 0 volts. However, since the inverter produces a 5 volt pulse step for any positive voltage input, the resulting pulse is squarely defined. In order to reorient the pulse train so that it is identical to the pulse train transmitted by the computer the signal is processed by inverter IV4. As a result, when a 0 or low logic voltage is sent by the computer, a positive going pulse results at the output of inverter IV4. The signal output at IV4 is fed to one input terminal of NAND gate A1 shown in FIG. 5. Input terminal 2 of NAND gate A1 has a high logic level voltage placed thereon via start flip flop F5 (shown in FIG. 5). Since A1 is a NAND gate, its output will be the mirror image of the output appearing at inverter IV4, however, the output code eminating from the output terminal of NAND gate A1 will be identical to the code originally sent by the computer. If NAND gate A1 were changed to an AND gate, then inverter IV4 would be eliminated from the circuit. However, since inverting gates are more convenient to construct they are used throughout the description of the transponder according to the present invention.

Figure 4:
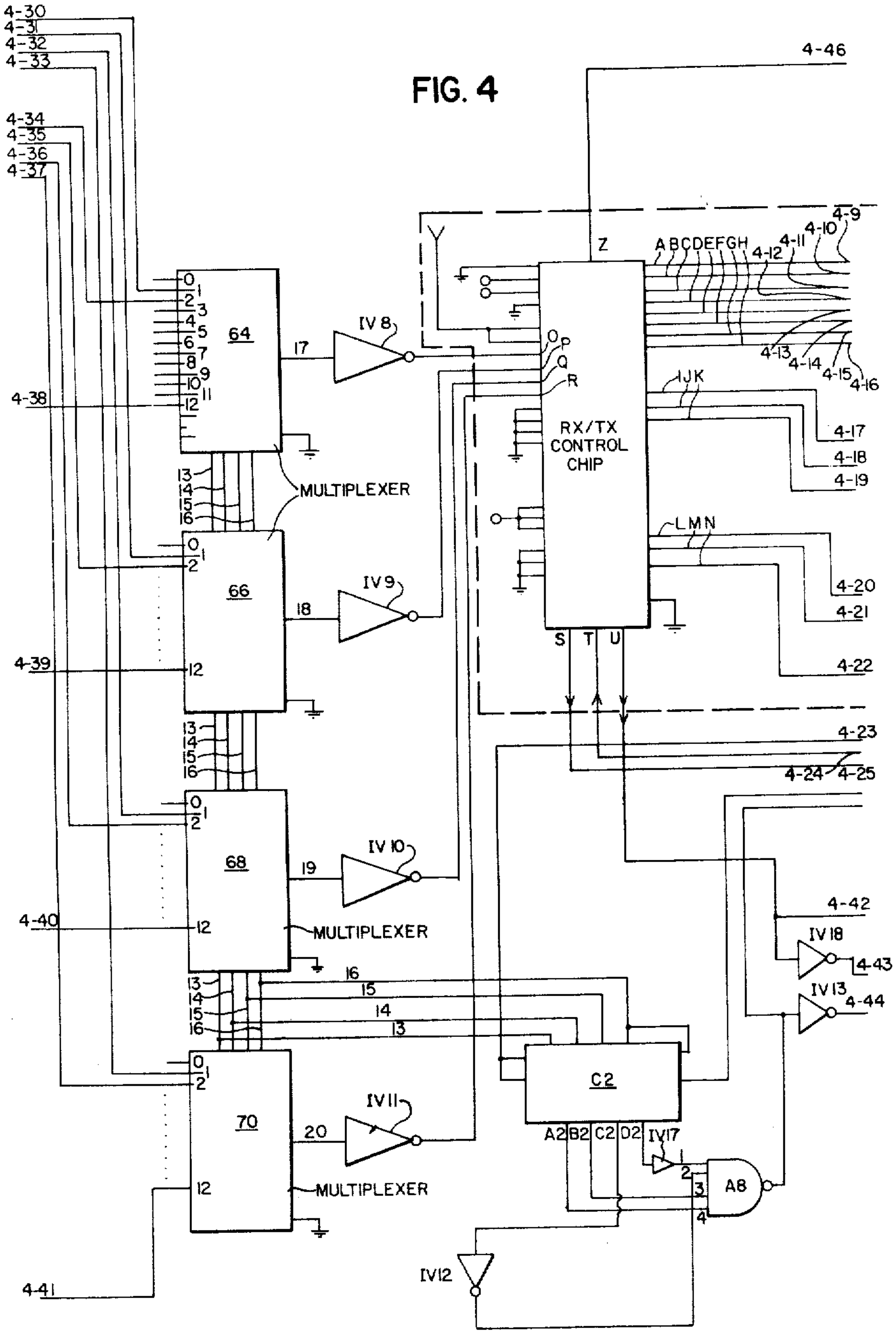

The heart of the transponder is the RX/TX control chip appearing in FIG. 4. This chip is made by several manufacturers and is known as a VAR/T chip (Universal Asynchronous RX/TX chip). The output code from NAND gate A1 is fed to input terminal T of the RX/TX control chip. The control chip receives the 12 bit binary interrogation code containing 8 information bits in a serial manner and connects this code in a parallel manner on eight output lines marked A through H. For example, if the 8 bit interrogation code for the transponder was 01101011, output lines A, D, and F would be at a "low" voltage level and output terminals B, C, E, G and H would be at a "high" voltage level.

Figure 5:
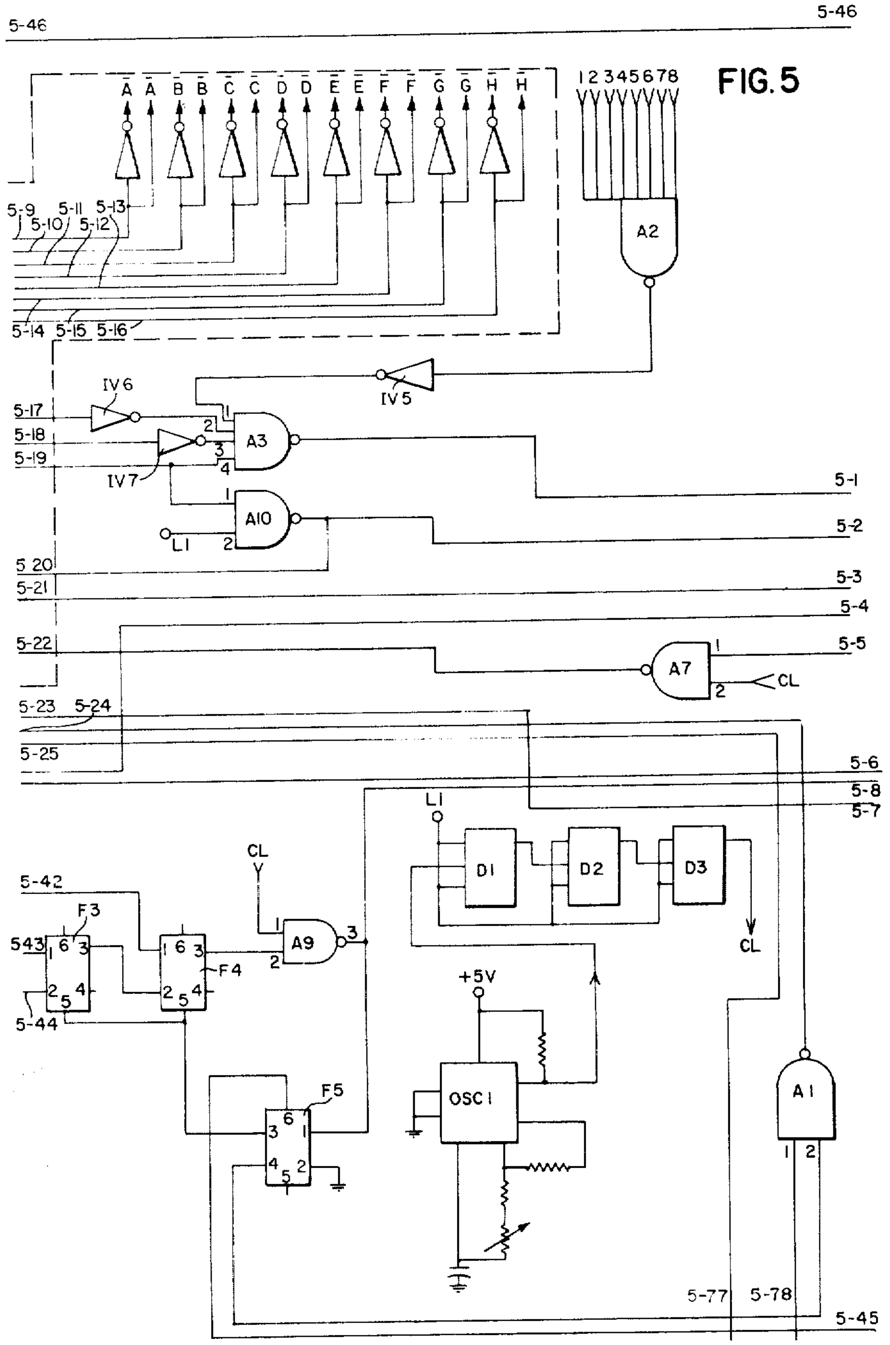

A series of 16 outputs appears at the top of FIG. 5. These 16 outputs are connected to the 8 outputs of the RX/TX control chip. Eight of the outputs appearing at the top of FIG. 5 marked A through H are directly connected to output terminal $\overline{A}$ through $\overline{H}$ of the RX/TX control chip. Eight outputs $\overline{A}$ through $\overline{H}$ are connected through inverters to their corresponding output terminals of the RX/TX control chip. The eight input terminals of NAND gate A2 can be hard wired, in a one to one correspondence to eight of the sixteen output terminals appearing at the top of page 5. For exmple, if the particular transponder being described was to be activated by the eight bit binary interrogation code mentioned earlier, i.e. 01101011 then output terminals $\overline{A}$, B, C, $\overline{D}$, E, $\overline{F}$, G and H would be connected to input terminals 1 through 8, respectively of NAND gate A2. When the central computer sends the correct code to the transponder a low logic level voltage pulse appears at the output of NAND gate A2. In an identical manner, 240 transponders can be connected to the same telephone line merely be assigning a different code to each and wiring the NAND gate A2 to the 16 outputs so that A2 is activated upon receipt of the correct code. This low pulse is inverted by inverter IV5 and fed to input terminal 1 of NAND gate A3. In addition, the RX/TX control chip outputs on terminals I and J two levels which check the code for accuracy. As mentioned earlier, the twelve bit code sent by the computer contained a parity check. The RX/TX control chip can be wired to observe either odd or even parity. For example, if even parity was being dealt with the computer would add a 1 to the code mentioned earlier since the code contained an odd number of 1's. Upon receipt of the code, the RX/TX control chip counts the number of 1's in the interrogation code and the parity bit and produces a low level voltage pulse on output terminal I if that count is correct. Output terminal I is fed to terminal 2 of NAND gate A3 via inverter IV6. As a result, terminal 2 goes high if the parity of the received interrogation code is correct.

As mentioned earlier, the code consists of a series of timed high and low level logic signals. The code under consideration is a 12 bit code with each high or low level logic sequence taking 6.6 milliseconds. As a result, the entire code from stop to start bit will be approximately 80 milliseconds long. The RX/TX control chip times the length of one code sequence and produces a low level logic voltage on output terminal J if the code was received in the correct period of time. Output terminal J is connected to terminal 3 of NAND gate A3 via inverter IV7. As a result, terminal 3 has a high level logic voltage appearing on it if the code was received by the RX/TX control chip in the correct time.

A high level logic voltage appears on output terminal K approximately 20 nanoseconds after the code has been received by the RX/TX control chip. If for any reason the RX/TX control chip does not process the code correctly, output terminal K stays at a low level logic voltage. Terminal K is directly connected to the fourth input of NAND gate A3. As a result, if the correct interrogation code is received by the RX/TX control chip, if the parity of that interrogation code is correct, if the RX/TX control chip received the code in the correct time period and if the RX/TX control chip processed the code correctly the output of NAND gate A3 will revert to a low logic level voltage. The low logic level voltage is applied to binary counter C1 thereby incrementing that counter to the 1 position and producing a high logic level voltage at its 1 output terminal. This high logic level voltage triggers a 350 millisecond one shot circuit element OS1 via line 1 producing a 350 millisecond long high logic level voltage at its output line 2. The central computer then sends the identical interrogation code a second time. As described before, the interrogation code is processed in the input modem shown in FIG. 7 and is fed to the RX/TX control chip via NAND gate A1. Again, if the code transmitted is correct, if its parity is correct, if its time sequence is correct and if the RX/TX control chip processed the code correctly NAND gate A3 is activated a second time putting a second low level logic pulse into binary decimal counter C1. As can be seen from FIG. 6, the 2 output of counter C1 is directly connected to terminal 1 of NAND gate A4. When the counter C1 is incremented to 2 a high logic level voltage is applied to terminal 1 of NAND gate A4. One shot circuit element OS1, as mentioned before outputs on line 2 a 100 millisecond long positive logic level voltage pusle. At the termination of this 100 millisecond time period the pulse goes to zero and activates a 3 microsecond one shot circuit element OS2. Output line 2 of the 3 microsecond one shot circuit element OS2 is connected to terminal 2 of NAND gate A4. If the interrogation code is received a second time within the 100 millisecond time period a high logic level pulse will appear on both input terminals 1 and 2 of NAND gate A4. As a result, NAND gate A4 will output a low level logic voltage pulse clocking flip flop F1 via terminal 1. When flip flop F1 is clocked, the voltage appearing at terminal 3 of flip flop F1 goes to a high level voltage state. The low level logic pulse from the output of NAND gate A4 also sets flip flop F5 via terminal 6. When flip flop F5 is set a low level logic voltage is fed to terminal 2 of NAND gate A1 from terminal 4 of F5. This inhibits NAND A1 from receiving any further data. As a result, the RX/TX control chip is disconnected from any further transmission through the received portion of the modem shown in FIG. 7. In addition when flip flop F5 is set terminal 3 goes to a high logic level voltage thereby enabling flip flop F3 and F4 via terminals 5. If on the other hand, the interrogation code is not received a second time within the 100 millisecond time period the one shot circuit element OS2 places a high level logic voltage on terminal 1 of NAND gate A5. A high level logic voltage is also applied to terminal 2 of NAND gate A5 via inverter IV7. This set of circumstances produces a low level logic voltage at the output of NAND gate A5. This low level logic pulse is fed to terminal 1 of NOR gate NOR1 and NOR gate NOR1 in turn produces a high level logic pulse to reset counter C1 to 0 thereby resetting the transponder in the standby state so that it can be acquisitioned again by the computer at the central location. When terminal 2 of NAND gate A1 is at a high logic level voltage and counter C1 is set at 0 the transponder is considered to be in a standby state. When the interrogation code has been received a first time and counter C1 has been incremented to its 1 position the transponder is considered to be in a ready state. When finally the interrogation code has been received a second time and NAND gate A4 has been activated the transponder is considered to be in an activated or transmit state.

Oscillator OSC1 and divider D1, D2 and D3 are arranged to generate clock pulses CL. These clock pulses are high level logic voltage pulses having a repetition rate of 2,400 Hertz. The clock pulses are used to time the operation of the control circuit and the transmission by the transponder.

The RX/TX control chip contains two transmitting registers. Information is fed to the control chip and fills the first register. This first register immediately empties its information into a second register. When the first register is emptied a high level logic voltage appears at terminal M of the RX/TX control chip. Terminal 1 of NAND gate A6 is connected to terminal M of the RX/TX control chip. Initially, a high logic level voltage appears on terminal 1 of NAND gate A6, because the first transmit register of the RX/TX control chip is emptied since no information has, as yet, been sent to it for transmission. The flip flop elements used in the transponder described are positive going edge triggered flip flops. NAND gate A4 produces, when activated, a 3 microsecond negative going pulse, due to the action of the one shot circuit element OS2. At the end of the negative going pulse the voltage at terminal 1 of flip flop F1 goes high clocking the flip flop. Terminal 3 of flip flop F1 is connected to terminal 2 of NAND gate A6. As a result, terminal 2 of NAND gate A6 is fed a high logic level voltage. Transmit flip flop F2 has been enabled since its reset terminal 5 is connected to terminal M of the RX/TX control chip. As a result, terminal 4 of flip flop F2 outputs a high logic level voltage. Terminal 4 of flip flop F2 is connected to terminal 3 of NAND gate A6. As a result, terminal 3 of NAND gate A6 has a high logic level voltage appearing thereon. NAND gate A6 is now ready to function upon receipt of a clock pulse on terminal 4. When clock pulse No. 1 occurs, NAND gate A6 functions and a low level logic signal appears at its output. This low level logic pulse is fed to binary counter C2 in FIG. 4 to increment it from a 0 position to a 1 position. In addition a negative going pulse is fed to terminal 1 of flip flop F2. However, since flip flop F2 is a positive going edge triggered flip flop it does not set at this time. It will not be clocked until NAND gate A6 is deactivated by the termination of clock pulse No. 1.

As mentioned above with reference to FIG. 3, even numbered counters 40 through 62 store the current count of the three power utilities being monitored. Each of the twelve counters have four output terminals. In particular, counter 40 has output terminals A1, B1, C1 and D1. Four multiplexing units 64, 66, 68 and 70 appear in FIG. 4. Each multiplexing unit has 13 input terminals indentified as 0 through 12. Each output of each of the twelve counters shown in FIG. 3 is connected to one of the 12 input terminals of each of the multiplexers 64, 66, 68 and 70. Output terminals A1 of counter 40 connects with input terminal 1 of multiplexer 64. Output terminal B1 of counter 40 connects with input terminal 1 of multiplexer 66. Output terminal C1 of counter 40 connects with terminal 1 of multiplexer 68 and output terminal D1 of counter 40 connects with terminal 1 of multiplexer 70. Similarly, the four output terminals of counter 42 are connected to input terminals 2 of multiplexers 64, 66, 68 and 70. All the remaining counters are connected to the input terminals of multiplexers 64, 66, 68 and 70 in a similar fashion, for example the four output terminals of counter 62, the last counter in the string of twelve counters, are connected to input terminals 12 of multiplexers 64, 66, 68 and 70. As a result, the input terminals of the four multiplexers have logic level voltages appearing thereon which correspond to the current count of the utilities being monitored. For example, when the input terminal No. 1 of the four multiplexers 64, 66, 68 and 70 are observed as a unit, logic level voltages are impressed upon them which correspond to the unit digit stored in counter 40 which in turn corresponds to the units digit of the current count of the power utility meter.

Each of the multiplexers 64, 66, 68 and 70 have four sensing terminals connected by wires 13, 14, 15 and 16. Wires 13, 14, 15 and 16 are also connected to counter C2. When NAND gate A6 incremented counter C2 to the 1 position, one of the sensing lines, for example line 16 was impressed with a high logic level voltage. A high logic level voltage appearing on sensing line 16 connects the output of each of the multiplexers 64, 66, 68 and 70 with input line No. 1 of those multiplexers. For example, if a high logic level voltage is present on terminal 1 of multiplexer 64, a low logic level voltage appears at output 17 of multiplexer 64. In general, an inverted logic level voltage will appear on output lines 17, 18, 19 and 20 of multiplexers 64, 66, 68 and 70 corresponding to the logic level voltage appearing on the input terminal being sensed. Inverters IV8, IV9, IV10 and IV11 re-invert the output logic level voltage appearing on lines 17, 18, 19 and 20 so that the logic voltage at the output of these inverters are identical with those at the input to the four multiplexers. Inverters IV8, IV9, IV10 and IV11 are connected to input transmit terminals O, P, Q and R of the RX/TX control chip. Counter C2 increments on a low level input pulse. As a result, when NAND gate A6 increments counter C2 to the 1 position, logic levels appears at input terminals O, P, Q and R of the RX/TX control chip which correspond identically to the logic voltage levels appearing at terminals A1, B1, C1 and D1 of counter 40. The logic level voltages appearing on input terminals O, P, Q and R immediately appear at the input to the buffer register of the transmit portion of the RX/TX control chip. The trailing edge of the pulse from NAND gate A6 sets flip flop F2 which applies a high level to one input of NAND gate A7. Pin 4 of flip flop F2 feeds back and disables NAND gate A6 to prevent further count pulses from being produced. At the next clock pulse, which is the second clock pulse in the series, a high level is applied to the second input of NAND gate A7 and a low level is produced from NAND gate A7 which is applied to pin N of the RX/TX control chip and strobes the data into the buffer register. At this time pin M of the control chip goes low indicating that the buffer register is full. This low level inhibits NAND gate A6. It also resets flip flop F2 which had been providing the disabling input to NAND A6. The resetting of flip flop F2 inhibits additional pulses from being generated by NAND gate A7. Once the data has been strobed into the buffer register, where the correct parity, start and stop bits are added. The internal logic checks to see if the main transmit buffer is full or in the process of transmitting. If it is free, the data is immediately transferred to the main register and transmission of th first character begins. Note that immediately below terminal R on the RX/TX control chip there appears four further input terminals all grounded. The RX/TX control chip is capable of sending, in addition to stop start and parity bits, 8 information bits. However, all 8 information bits are not used. If they were used, it would be possible for the transponder to transmit back to the computer a code which would be identical to the interrogation code of another transponder. This possibility is eliminated since 4 consecutive bits of information sent back to the computer by the transponder will always be at a low logic level. Interrogation codes are arranged so that there will never be a code having 4 consecutive low level logic bits.

As mentioned above, the first code train to be sent from the transponder to the central computer now exists in the second register of the RX/TX control chip. The code train consists of a start bit, 4 information bits, 4 blank bits, a parity bit and 2 stop bits. The data is now transmitted out of the RX/TX control chip from pin S. Output terminal S is connected to the transmit portion of the modem shown in FIG. 7. Note that the activation of NAND gate A6 initiated the entry of information into the first register of the RX/TX control chip. Also note that the activation of NAND gate A7, one clock pulse later initiated the transmission of the information contained in the second register of the RX/TX control chip. In this manner, a time delay is arranged to allow time for the information stored in the even number counters 40 through 62 to be transmitted to the RX/TX control chip via multiplexers 64, 66, 68 and 70, and inverters IV8, IV9, IV10 and IV11.

As mentioned above, when the buffer register of the RX/TX control chip was filled, output terminal M of the control chip went to a low logic level. This low level inhibits pin 1 of NAND gate A6 and at the same time resets flip flop F2 through pin 5. Now pin 4 of flip flop F2 goes high which is fed back to pin 3 of NAND A6. Even though pin 3 is at a high logic level, the gate is still disabled by pin 1 of NAND A6 being low. Pin 3 of flip flop F2 goes low disabling pin 1 of NAND A7. The low level from pin M of the RX/TX chip only stays low as long as the buffer register is full. As soon as the contents of the buffer register has been transferred to the transmit register the buffer register is able to receive a new character. It is at this point that pin M of the RX/TX control chip goes high. This high logic level enables pin 1 of NAND gate A6. Now all the inputs of NAND gate A6 are high. As a result, when the next clock pulse appears at terminal 4 of NAND gate A6, the gate is activated thereby incrementing counter C2 to the 2 position. When counter C2 is incremented to the 2 position the information appearing on input terminal 2 of multiplexers 64, 66, 68 and 70 is fed into the RX/TX control chip via inverters IV8, IV9, IV10 and IV11. At this time, the information stored in the second register is being transmitted out line S of the RX/TX control chip and so this second binary code, i.e. the binary code stored by counter 42 in FIG. 3 enters the buffer register of the RX/TX control chip one clock pulse after the incrementation of counter C2. Immediately upon its entry into the first register it is transferred to the second register when the second register has been emptied. As a result, the first register is again cleared to receive information from the next counter shown in FIG. 3. It should be noted that, due to the timing of the activation of NAND gates A6 and A7, two simultaneous functions can take place. The first function is the incrementing of counter C2 and the transfer of information from one of the counters shown in FIG. 3 into the buffer register of the RX/TX control chip. The second function is the transmission of the coded information from the second register of the RX/TX control chip via line S through the transmit portion of the modem.

The above described sequence takes place for each of the even numbered counters 40 through 62. As a result, 12 code trains are sent from the transponder to the central computer. These 12 code trains repesent the infomation stored in the twelve counters shown in FIG. 3.

Counter C2 has four output terminals A2, B2, C2 and D2. When the NAND gate A6 is activated for the twelfth time, output terminals A2 and B2 of counter C2 will go to a high logic level voltage. Output terminals A2 and B2 are connected to terminals 3 and 4 of NAND gate A8. As a result, a high logic level voltage will appear on input terminals 3 and 4. Output terminal C2 and D2 of counter C2 will have a low level logic voltage appearing thereon. This low level logic voltage is inverted by inverter IV12, and IV17 and a high level logic voltage is applied to terminals 1 and 2 of NAND gate A8. As a result, when counter C2 increments to count 12 NAND gate A8 is activated. As a result, a low logic level voltage appears at the output of NAND gate A8. This low level logic voltage is inverted by inverter IV13 and a high logic level voltage is applied to terminal 2 of flip flop F3. The low output from NAND A8 is fed to the reset input pin 5 of flip flop F1 and input 2 of NOR 1. When the output of NAND A8 goes low, both flip flop F1 and counter C1 are reset. Resetting flip flop F1 inhibits NAND A6 from generating any further pulses. It must be remembered that when a 12 count pulse is generated the RX/TX control chip is in the process of transmitting the eleventh character. Therefore the rest of the system cannot be reset at this time. This count 12 low level pulse from NAND A8 is inverted to a high level by IV13 and applied to pin 2 of flip flop F3. The output, pin 5 of flip flop F3 is normally low and applied to pin 2 of flip flop F4. An end of character pulse is generated from pin U at the end of every character. The end of character pulses are applied to pin 1 of flip flop F4 and pin 1 of flip flop F3 through inverter IV18. With pin 2 of flip flop F3 low during counts of 0–11, the flip flop F3 and flip flop F4 are not effected by end of character pulses. When the twelfth count is generated, pin 2 of flip flop F3 goes high. The eleventh end of character pulse now switches pin 3 of F3 to a high level. The twelfth and last end of character pulse drives pin 3 of F4 high because pin 2 of F4 is now high. This high level is applied to one input of NAND A9. The other input has clock pulses applied. When a clock pulse is applied to NAND A9 the output is driven low for the duration of the clock pulse, this pulse is applied to pin 3 of NOR2 and pin 1 of flip flop F5. The output, pin 3 of flip flop F5 is driven low and resets F3, F4 through pins 5. The inverted output, pin 4 of flip flop F5 is driven high which enables pin 2 of A1 and allows another interrogation code to be processed. The output terminal of NAND gate A9 is also connected to terminal 3 of NOR gate NOR2. A low level logic voltage appearing at terminal 3 of NOR gate NOR 2 activates the NOR gate placing a high level logic voltage at its output. Counter C2 is connected to NOR gate NOR2 so that a low level logic voltage appearing at the input to NOR gate NOR2 resets counter C2 to 0. The output of NOR gate NOR2 is also connected to input terminal 2 of the RX/TX control chip shown in FIG. 4. Activation of this NOR gate resets the entire RX/TX control chip. Two other sets of circumstances will activate NOR gate NOR2. If the second interrogation code is not correctly received by the transponder in the 200 millisecond time period NAND gate A5 activates NOR gate NOR2 via input line 1 to reset the counter C2 thereby insuring that the counter C2 is reset to 0 even though it was probably at 0 in the first place. In addition, the RX/TX control chip is reset. As mentioned above, when the RX/TX control chip receives the interrogation code correctly, output line K goes to a high level logic voltage. This high level logic voltage is connected to terminal 1 of NAND gate A10. As a result, NAND gate A10 is activated and sends a low level logic pulse to input terminal L of the RX/TX control chip. This action causes output terminal K of the RX/TX control chip to go to a low level logic voltage and readys the RX/TX control chip to receive more information. The output of NAND gate A10 is also connected to terminal 2 of NOR gate NOR2. As a result, each time the RX/TX control chip is readied to receive new information NOR gate NOR2 is activated thereby resetting counter C2 to 0 and of course the RX/TX control chip itself. This eliminates the possibility that the counter C2 could accidently be set at some count other than 0 thereby ensuring that when the counter is next incremented it activates the 1 inputs of the multiplexers 64, 66, 68 and 70.

The transmit portion of the modem shown in FIG. 7 will now be discussed in detail. Operational amplifier OA3 is arranged as an oscillator circuit. This oscillator generates a frequency in the neighborhood of 2025 hertz. Operational amplifier OA4 acts as an amplifier buffer for the oscillator OA3. Inverter IV14 inverts the code train being sent the RX/TX control chip via line S so that logical ones in the code train take on, at the output of the inverter low logic level voltages and logical zeros of the pulse train take on, at the output of the inverter high logic level voltages. The inverted pulse train is amplified by operational amplifier OA5. As a result, at the output of operational amplifier OA5 the low logic level voltage will be −12 and the high logic level voltage will be +12 volts. The −12 volt low logic level voltage appearing at the output of operational amplifier OA5 biases field effect transistor Q1 into conduction. As a result, a burst of a frequency of 2025 hertz passes through the transistor Q1 for a time period equal to the time period of the low level logic voltage. When a high level logic voltage appears at the output of operational amlifier OA5 transistor Q1 is biased into cut-off and no frequency burst passes through the transistor. The output of transistor Q1 is fed to power transistor Q2 which in turn feeds the tip and ring lines of the telephone system via transformer T1. As a result, a 0 level logic voltage bit of the pulse train transmitted from the RX/TX control chip is represented by a 6.6 millisecond burst of a frequency of 2025 hertz. A high logic level voltage bit of the pulse train transmitted from the RX/TX control chip is converted into a 6.6 millisecond time period of no frequency burst on the tip and ring lines of the telephone system. It should be noted that operational amplifiers OA1 and OA2 have sufficient band width to process the transmitted code train however, once the transponder correctly receives the interrogation signal a second time, NAND gate A1 is inhibited, the transponder is isolated from any action that the receipt of this transmitted code train might perform.

Figure 8:
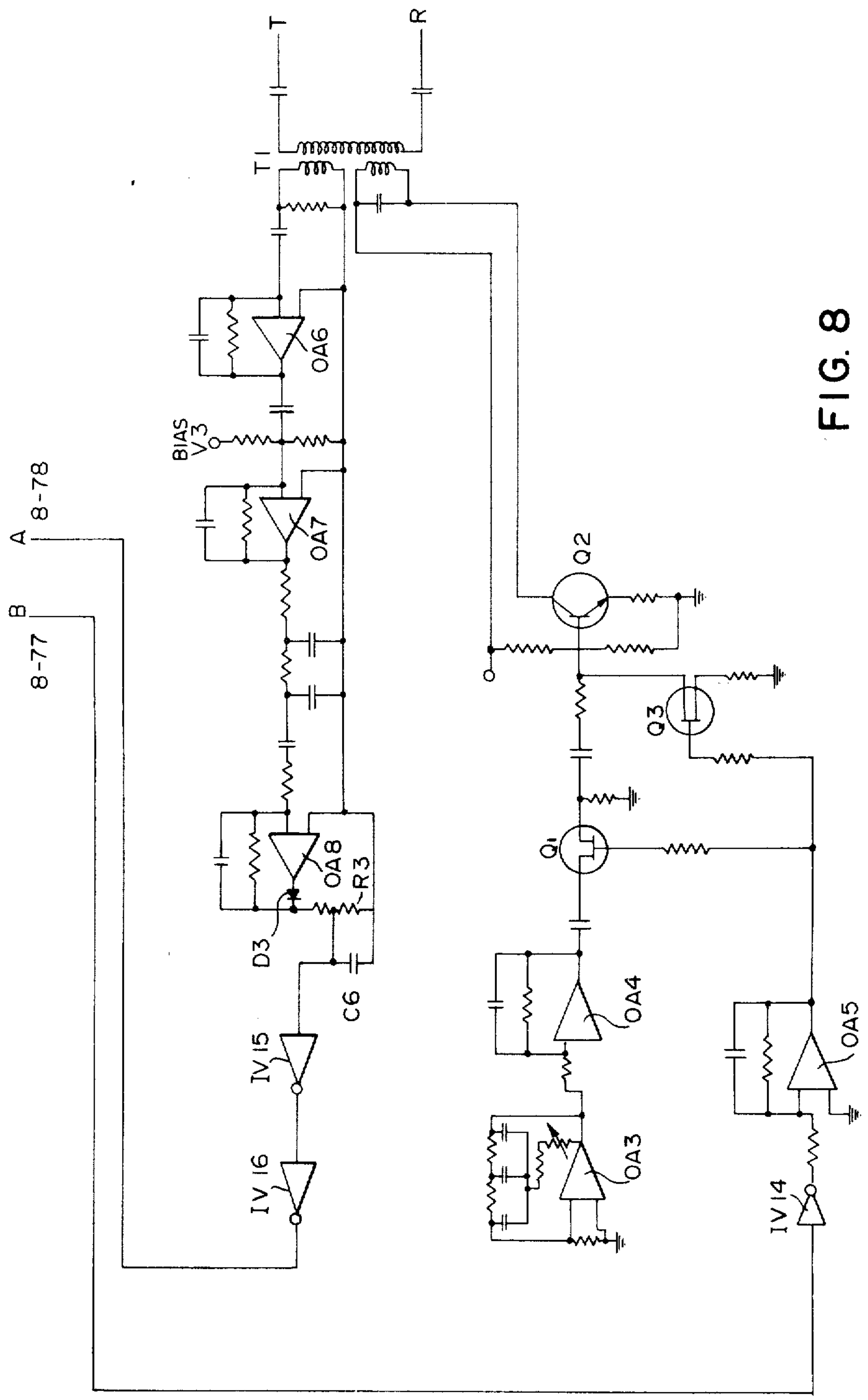

FIG. 8 of the drawings show a second embodiment of the transmit and receive modem which can be used in the transponder according to the present invention. Thhe interrogation code train and the transmitted code train move through the tip and ring lines, T and R, of the telephone system. As incoming code train is connected to operational amlifier OA6 via transformer T1. Frequency burst of a frequency in the neighbourhood of 2,000 hertz and having a time duration of 6.6 milliseconds represent logical 0 bits. The frequency burst is amplified by operational amlifier OA6. The output of operational amplifier OA6 feeds a second operational amplifier OA7. The zero crossing point of operational amplifier OA7 is biased slightly away from 0 volts by biased voltage V3. As mentioned above, it has been found that certain regions of the frequency burst contain the maximum amount of noise. These regions are the zero crossing points and the peaks of the frequency bursts. As a result, the amplifier OA7 is biased so that the zero crossing point is in effect approximately −1 volt below the zero voltage crossing point of the signal. As a result, operational amlifier OA7 amplifies the incoming frequency burst around a region of minimum noise. The signal leaving operational amplifier OA7 has been amplified to a point where operational amlifier OA7 is limiting. As a result, due to the limiting action of the amplifier, a considerable portion of any noise appearing on the frequency burst has been clipped away. Capacitors C4 and C5 are connected between the output of operational amplifier OA7 and gound and filter away any remaining high frequency noise. The output of operational amplifier OA7 is connected to the input of operational amplifier OA8. The input signal level of operational amplifier OA8 is relatively high since the signal has already been amplified by two stages. As a result, the output of operational amplifier OA8 is a clipped or limited frequency burst having a zero voltage crossing in a relatively noise free portion of the frequency burst due to the biasing of operational amplifier OA7 via biasing voltage V3. The frequency burst at the output of operational amplifier OA8 is detected by diode D3. The 2,000 hertz frequency contents is removed by the integrater circuit comprising capacitor C6 and a resistor R3. The original frequency burst representing a logical 0 binary bit is processed at the output of the integrater network to form a high level logic voltage pulse. However, the pulse is not a perfectly defined square pulse and so it is processed through inverter IV14. The pulse eminating from inverter IV14 is a low level logic voltage pulse. This low level logic pulse must be inverted by inverter IV15 so that when it is processed by NAND gate A1 shown in FIG. 5, it enters the RX/TX control chip shown in FIG. 4 as a low level voltage pulse corresponding to the originally transmitted 0 logic bit.

The transmit portion of the modem shown in FIG. 8 is similar to the transmit portion of the modem shown in FIG. 7. As a result, like elements in FIG. 8 have the same designations as their counterparts in FIG. 7. In the transmit modem shown in FIG. 7 transistor Q2 is biased so as to conduct at all times during the transmission of the binary code pulse train. Transistor Q2 is conducting even when a low level logic voltage bit is being transmitted. Since transistor Q2 is conducting during that time noise is introduced into the code train. The transmit modem shown in FIG. 8 employs transistor Q3 which biases transistor Q2 into cut-off when no frequency burst is to be transmitted through the telephone line. Transistor Q3 acts n a complementary manner to transistor Q1. When transistor Q1 is conducting, transistor Q3 is biased so as to be in cut-off. Similarly, when transistor Q1 is biased into cut-off transistor Q3 is conducting thereby biasing transistor Q2 into cut-off. The transmit portion of the modem shown in FIG. 8 reduces the noise in the code train when a 1 logic level voltage is to be transmitted. This adaptation of the transmitter is used for extra low noise applications.

Figure 9:
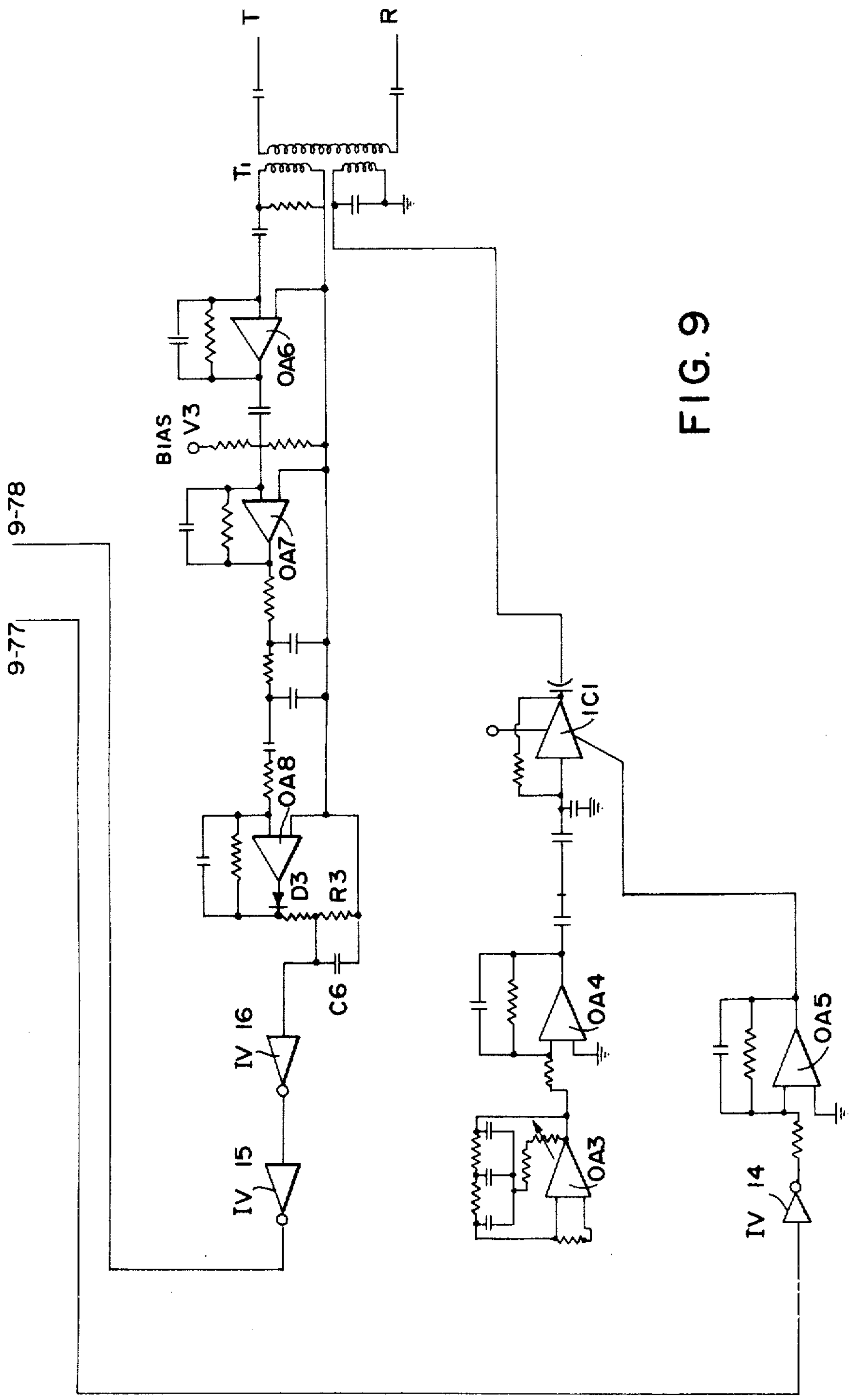
Figures 6, 10:
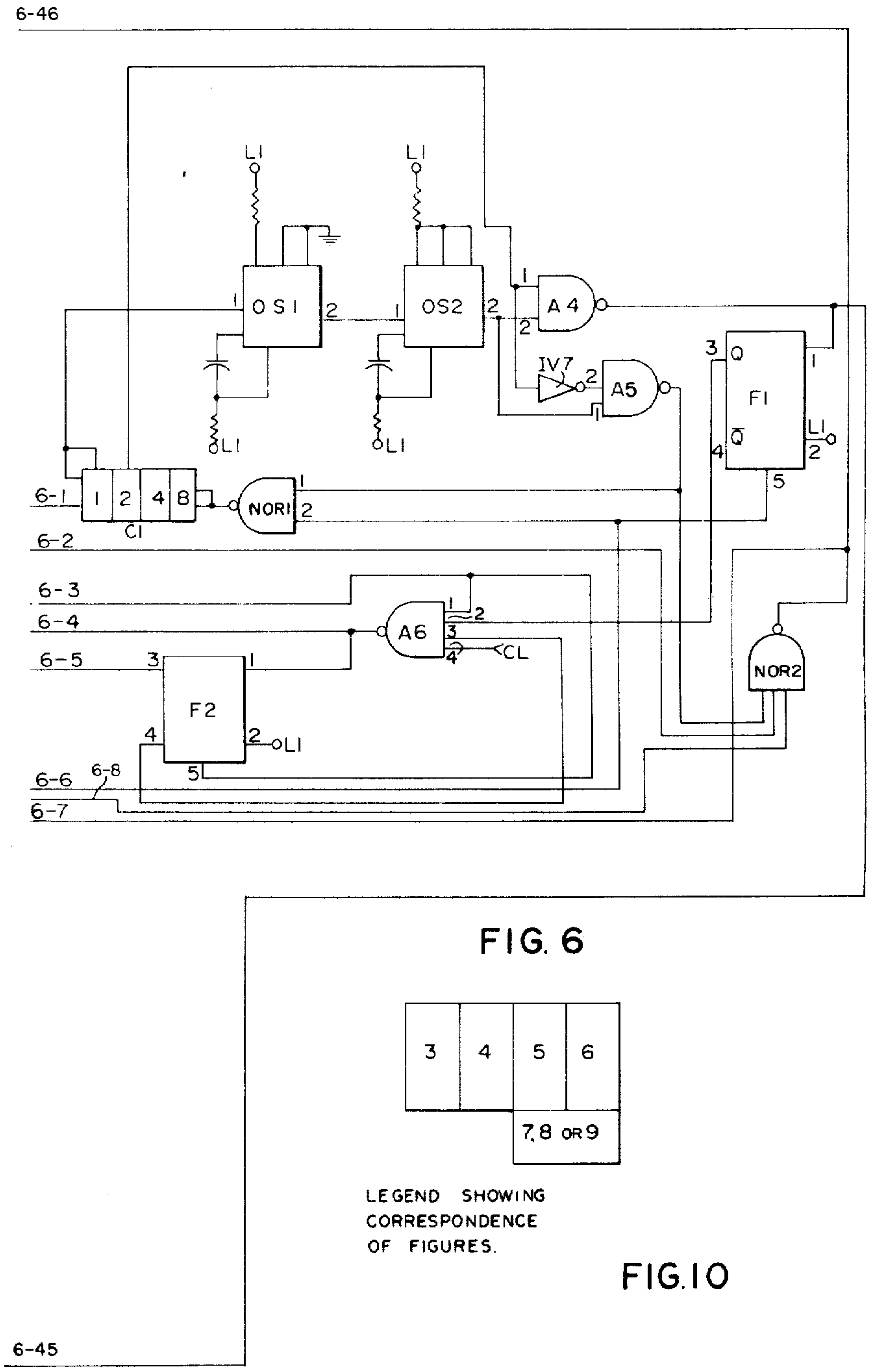
FIG. 10 is a legend showing the physical relationship of FIGS. 3, 4, 5 and 6 and FIGS. 7 or 8 or 9.

FIG. 9 of the drawings shows yet another embodiment of a transmit receive modem used with the transponder of the present invention. The receive portion of the modem is identical to the receive portion of the modem shown in FIG. 8. The only difference in the transmit portion of the modem from that shown in FIG. 8 is the integrated circuit ship IC1. Integrated circuit chip IC1 replaces the combination of transistors Q1, Q2 and Q3 shown in FIG. 8. The output signal from integrated circuit IC1 is of a sufficient power to drive the transformer T1 directly.

It should be noted that the modem units shown in FIGS. 7, 8 and 9 all contain, in both their receive and transmit portions broad band networks. As mentioned above, prior art modem units reduce noise levels by employing narrow band tuned circuits. However, narrow band tuned circuits tend to detune with age, especially high Q tuned circuits used in prior art modems. The present invention contemplates an operating life, without service, of approximately 10 years. If tuned circuits were employed in such a system its reliability would be reduced with time and, it is doubtful, that a system could be maintained using such circuits for the 10 year period. As a result, not only does the present invention contemplate a unique system for remotely reading meters and a unique transponding unit, it also employs unique transmit and receive modems.

It should be noted, that the computer interface 14 shown in FIG. 1 employs the use of transmit and receive modems identical to the modems used with the transponder according to the present invention. The modems used in the computer interface and in the transponder process the binary coded signal trains to enable them to be transmitted in both directions through existing telephone lines.

It should also be noted that the preferred embodiment of the present invention has been discussed in detail using a great advantage integrated circuit components. The scope of the present invention encompasses a system which uses discrete circuit components.

In some applications it is not possible to provide the transponder with a source of power. As a result, it is not possible to use a storage means to keep track of the current count of the utility meters. The present invention encompasses a second embodiment that does not employ a storage means but transmits what is known as a "snapshot" or the actual current reading of each meter from the transponder to the central computer. Such an embodiment, unless activated by some command, does not consume any electric power, and so such a transponder can be used in applications in which a power source other than the telephone line itself is not available.

Figure 11:
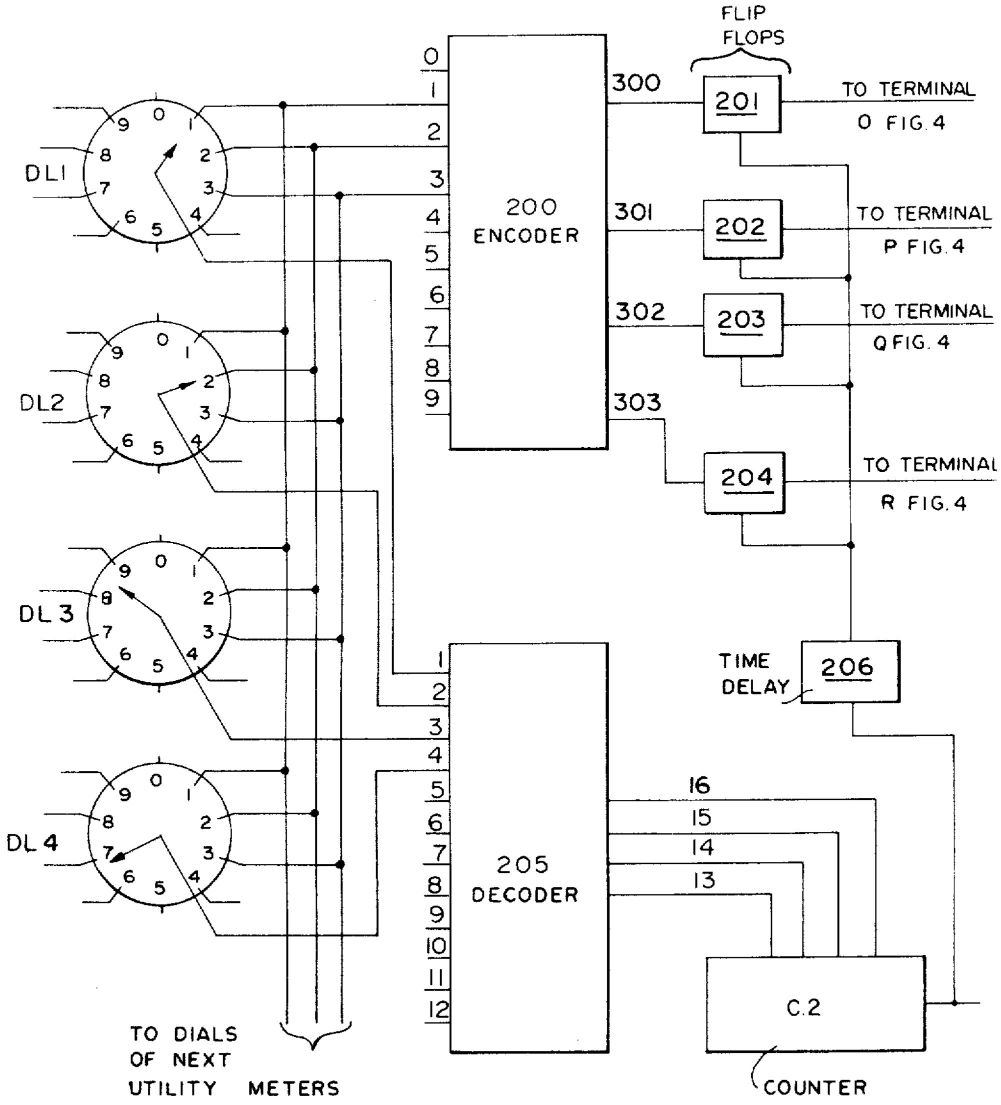
FIG. 11 is a schematic diagram of a portion of a second embodiment of a transponder according to the present invention.

Concerning the second embodiment, FIG. 11 of the drawings replaces FIG. 3, the multiplexers 64, 66, 68 and 70 and the inverters IV8, IV9, IV10 and IV11 of FIG. 4. The four outputs of the circuitry of FIG. 11 shown in the top right hand side connect directly to the O, P, Q and R input terminals of the RX/TX control chip shown in FIG. 4. The counter C2 shown in FIG. 11 is the same counter C2 shown in FIG. 4. FIG. 11 is only a partial schematic of the second embodiment. Dials DL1, DL2, DL3 and DL4 represent the unit, tens, hundreds and thousands digits of the first utility meter. The 0, 1, 2, .... 9 outputs of each dial is respectively connected to the 0, 1, 2, .... 9 outputs of each other dial of the same utility meter. A second utility meter (not shown) also has four dials and each of these dials is wired in exactly the same manner. Finally, all three utility meters are wired together to produce 10 output lines, the 0, 1, 2, .... 9 output lines of each dial of each meter being interconnected. For simplicity, only the 1, 2 and 3 lines are fully shown for one utility meter in FIG. 11. The 10 meter outputs 0 through 9 are fed to the input terminals of an encoder 200. The encoder converts a decimal input signal appearing at its input into a code capable of being transmitted on a four wire line. One example of such a code would simply be a binary code and in that case the encoder 200 would be a decimal to binary converter.

The four outputs of the encoder 200 are each fed to flip flop circuit elements 201, 202, 203 and 204.

The pointer of each dial makes electrical contact with a contact pad or the like located at each numeral on the dial face. As a result, each dial is a 10 position rotary switch. Each pointer is connected to one of the 12 outputs of a binary to decimal decoder 205. The input to decoder 205 is the four lines 13, 14, 15 and 16 from the counter C2. The strobe or input line to the counter C2 is also connected to the enable inputs of the flip flops 201, 202, 203 and 204 via a time delay circuit 206.

In operation, when the counter C2 increments to 1 as was described with reference to a first embodiment, a binary 1 is sent to decoder 205 via lines 13, 14, 15 and 16. The decoder 205 decodes this input to place a high logic level voltage on output line 1 and a low level logic voltage on the remaining 11 output lines. As a result, a high logic level voltage is placed on the pointer of dial 1 of the first utility meter. Depending at which numeral, i.e. 0 through 9, the pointer of dial 1 is pointing, the high logic level voltage appears on one of the 10 inputs, 0 to 9 of encoder 200. The encoder in turn, translates this high logic level decimal input to some form of code capable of being transmitted on a four wire line. Depending upon which code is used and depending upon which decimal input is present a combination of high and low logic level voltages will appear on output lines 300, 301, 302 and 303 of the encoder 200. Output lines 300, 301, 302 and 303 are respectively connected to the inputs of flip flops 201, 202, 203 and 204.

It takes a finite length of time for the counter C2 to be activated, for the decoder 205 to operate, for the encoder 200 to operate and for the output lines 300, 301, 302 and 303 to stabilize. As a result, a time delay 206 is connected between the input line of the counter C2 and the enable lines of the four above mentioned flip flops. After a predetermined time delay, time delay which is less than one clock pulse, flip flops 201, 202, 203 and 204 are enabled and the high and low logic level voltages appearing on lines 300 through 303 are transmitted to the O, P, Q and R inputs of the RX/TX control chip. The circuit then functions as was described with respect to embodiment 1. When the counter C2 increments to binary 2 the decoder 205 places a high logic level voltage on output line 2 and a low level logic voltage on the remaining eleven lines. As a result, the pointer of dial 2 is impressed with a high logic level voltage. In the manner just described, one of the input lines to the encoder 200 is impressed with a high logic level voltage, the line number depending on the current reading of dial 2. The encoder 200 outputs a code on lines 300 through 303 which is in turn fed to the RX/TX control chip via flip flops 201, 202, 203 and 204 which are enabled via the time delay 206.

In the manner described above, the counter C2 increments from 1 through 12, thereby impressing, in sequence, a high level logic voltage on each of the pointers of each of the 12 dials contained in the three utility meters. The current reading of each dial of each meter is transmitted from the remote transponder to the central computer.

What I claim as my invention is:

1. A system for remotely reading utility meters comprising:

a. a centrally located unit comprising:

i. a digital computer having a first storage unit for storing a plurality of binary interrogation code trains, and a second storage unit for receiving binary code trains and a control unit;

ii. an automatic telephone dialing unit, controllable by said control unit;

iii. a first computer/telephone interface, said interface connecting said computer to said automatic dialing unit, said interface also processing codes compatible with said computer into codes compatible with said automatic dialing unit, said interface also processing codes compatible with said automatic dialing unit into codes compatible with said computer;

b. a plurality of remotely located transponders, each transponder being comprised of:

i. a second computer/telephone interface, said second interface connecting said transponder to said computer via a telephone line, a central exchange, said automatic dialing unit and said first interface, said second interface adapting codes from said telephone lines for use in said transponder and adapting codes from said transponder for transmission over said telephone line;

ii. a decoder, said decoder being connected to said second interface and producing an output pulse in response to a particular one of said plurality of binary interrogation code trains received from said centrally located unit, iii. a storage unit connected to at least one sending unit, said sending unit being connected to a utility meter, said storage unit storing in binary coded decimal form the curent reading of each utility meter thereto connected;

iv. a transmitter, said transmitter being connected to said storage unit and also connected to said second computer/telephone interface;

v. a control circuit connected to said decoder, said control circuit switching from a first state to a second state upon receipt of said output pulse, said control circuit switching from said second state to a third state upon receipt, a second time, of said output pulse within a predetermined time period, said control circuit switching from said second state to said first state if said output pulse is not received within said predetermined time period, said control circuit, when in said third state, controlling said transmitter to transmit said binary code trains from said storage units to said second storage units of said computer, said control circuit switching from said third state to said first state upon the termination of said transmission.

2. A telemetering transponder for storing and transmitting in the form of binary code trains, to a telephone line, the current reading of n number of utility meters, where *n* is a positive integer, said transponder comprising:

a. *n* data input terminals, each connected to n utility meters via n sending units in a 1-to-1 correspondence, each of said *n* sending units producing voltage pulses, each voltage pulse representing one unit of consumption monitored by a utility meter;

b. a storage unit connected to said *n* input terminals for counting and storing in a binary code the sum of the voltage pulses eminating from each of said *n* sending units;

c. a receiving unit for receiving a binary interrogation code from a telephone line and adapting said code for use by said transponder;

d. a decoder connected to said receiving unit which produces an output pulse upon receipt of a particular binary interrogation code;

e. a binary code train encoder, for encoding said binary code stored in said storage unit to produce a binary code train;

f. a transmitting unit; and g. a control circuit connected to said decoder, said control circuit switching from a standby state to a ready state upon receipt of said output pulse, a first time, said control circuit switching from said ready state to an operating state upon receipt of said output pulse, a second time within a predetermined time period, said control circuit switching from said ready state to said standby state if said pulse is not received within said predetermined time, wherein said control circuit, when in said operating state connects said storage unit to said encoder to thereby produce said binary code train and wherein said control circuit also connects said encoder to said transmitting unit to thereby transmit said binary code train, said control circuit switching from said operating state to said standby state upon the termination of the transmission of said binary code train.

3. A transponder according to claim 2, wherein said receiving unit receives a binary data code train, said date code train being a code train wherein a logical O is represented by a frequency burst of a frequency F for a predetermined time period and a logical 1 is represented by a time period of no frequency burst and wherein said receiver unit converts said binary code train into a series of high and low logic level voltages representing logical 1 and logical 0 respectively, said receiving unit comprising:

a. an input terminal for receiving said binary data code train;

b. a first operational amplifier stage, said first stage having an input connected to said input terminal, said first stage being biased so that said frequency burst is amplified equally about a bias point located at a first predetermined D.C. voltage;

c. a first diode connected between said first operational amplifier output and ground;

d. a second operational amplifier, connected to said first operational amplifier and said diode for amplifying and inverting said frequency burst;

e. first and second inverters connected in series and to the second operational amplifier output for selecting the amplified portion of said frequency burst which lies between the 0 base voltage of the output of said first operational amplifier stage and a second predetermined D.C. voltage;

f. a second diode connected in series with said first and second inverters for eliminating any negative going portion of said frequency burst;

g. an integrator network connected to said second diode for eliminating the frequency burst to produce a direct current voltage level corresponding to said frequency burst and therefore corresponding to the logical 0 of said data code train; and h. a third inverter connected to said integrator for inverting said positive voltage level to form a 0 level logic voltage.

4. A transponder according to claim 2 wherein said receiving unit receives a binary data code train, said data code train being a code train wherein a logical 0 is represented by a frequency burst of a frequency F for a predetermined time period and a logical 1 is represented by a time period of no frequency burst and wherein said receiving unit converts said binary code train into a series of high and low logic level voltages representing logical 1 and logical 0 respectively, said receiving unit comprising:

a. an input terminal for receiving said binary data code train;

b. a first operational amplifier stage for amplifying said frequency burst;

c. a second operational amplifier stage connected in series with said first operational amplifier stage for amplifying said frequency burst, said second operational amplifier stage being biased so as to amplify said frequency burst equally about a bias voltage point located at a predetermined D.C. voltage;

d. a third operational amplifier stage connected in series with said second operational amplifier stage to further amplify said frequency burst equally about said predetermining D.C. voltage;

e. a diode connected in series with said third operational amplifier for substantially removing the negative going portion of said frequency burst;

f. an integrator network connected in series with said diode for removing the frequency F from said burst thereby producing a positive logic level voltage corresponding to said burst; and g. at least one integrator stage connected in series with said integrator network.

5. A transponder according to claim 2 wherein said transmitting unit includes:

a. an oscilator network for producing a transmit burst frequency;

b. a power amplifier stage;

c. a first electronic switch connecting said oscilator to said power amplifier stage;

d. a switch driving stage, connected to said switch, said driving stage controlling said switch to conduct said burst frequency from said oscilator to said power amplifier stage in response to said binary code train.

6. A transponder according to claim 5 wherein said first electronic switch is comprised of a field effect transistor.

7. A transponder according to claim 5 wherein said transmitter unit further includes a second electronic switch, said second electronic switch being controllable by said switch drive stage and being biased so as to conduct when and only when said first electronic switch is not conducting, said second electronic switch being connected to said power amplifier stage to bias said power amplifier stage into cut-off when said second electronic switch is conducting.

8. A transponder according to claim 7 wherein said first and second electronic switches are comprised of field effect transistors.

9. A transponder according to claim 2 wherein said storage unit is comprised of **4*n*** decade counters, said counters being arranged in n groups of four counters each, each groupo of four counters being serially connected to one another and to one of said *n* sending units for receiving pulses therefrom, each group of four counters comprising:

a. a first counter connected to said one of said *n* sending units for storing the units digit, in 4 bit binary coded form of the current reading of one of said *n* utility meters;

b. a second counter connected to said first counter for storing the tens digit, in 4 bit binary coded form of the current reading of said one of said *n* utility meters;

c. a third counter connected to said second counter for storing the hundreds digit, in 4 binary coded form of the current reading of said one of said *n* utility meters; and d. a fourth counter connected to said third counter for storing the thousands digit, in 4 bit binary coded form of the current reading of said one of said *n* utility meters.

10. A transponder according to claim 2 wherein said decoder comprises:

a. a serial to parallel code converter having one serial input terminal for accepting said interrogation code train and eight parallel output terminals;

b. eight inverters connected to said eight output terminals to form a total of 16 output terminals;

c. a first NAND gate having eight input terminals and one output terminal, said eight input terminals being selectively connected to eight of said 16 output terminals to activate said NAND gate upon the receipt of said particular binary interrogation code train; and d. a second NAND gate having first, second, third and fourth input terminals and one output terminal, wherein said first input terminal is connected to the output terminal of said first NAND gate and wherein said second, third and fourth input terminals of said second NAND gate are connected to said serial to parallel converter, said second NAND gate thereby producing said pulse upon receipt of said particular interrogation code.

11. A transponder according to claim 10 wherein said serial to parallel converter is contained within a portion of a RX/TX control chip.

12. A transponder according to claim 2 wherein said control circuit includes:

a. a 4 bit binary counter connected to said decoder, said counter having first, second, third and fourth output terminals;

b. a first one shot circuit element, connected to said first output terminal of said binary counter;

c. a second one shot circuit element connected to said first one shot element and having an output terminal;

d. a NAND gate having a first and a second input and an output terminal, the first input terminal of said NAND gate being connected to the output terminal of said second one shot element, the second input terminal of said NAND gate being connected to the second output terminal of said counter; wherein, said NAND gate is activated when and only when a high logic level voltage appears simultaneously at said first and second input terminals of said NAND gate, the activation of said NAND gate representing said operating state of said control circuit.

13. A transponder according to claim 12 wherein said control circuit further includes a second NAND gate having first and second input terminals and an output terminal, the first input terminal of said first mentioned NAND gate being connected to the first input terminal of said second NAND gate, the second input terminal of said first mentioned NAND gate being connected via an inverter to the second terminal of said second NAND gate, the output terminal of said second NAND gate being connected to one in put terminal of a first NOR gate, said NOR gate having an output connected to the reset terminal of said binary counter, wherein, a high logic level voltage simultaneously appearing on the first and second input terminals of said second NAND gate activates said second NAND gate to thereby reset said counter to 0 representing a switching of state of said control circuit from said ready state to said standby state.

14. A transponder according to claim 13, wherein said control circuit further includes:

a. a first register;

b. a plurality of multiplexing units, each having one output, each output of said multiplexing units being connected to said first register, said multiplexing units having a plurality of inputs connected in a 1-to-1 correspondence with said four end decade counters;

c. a multiplexer control counter, connected to each of said multiplexers; wherein, said control circuit, when in said active state, controls the count of said multiplexer control counter, via a NAND gate and a clock pulse, to connect selected inputs of said multiplexer to said first register;

d. a second register connected to said first register and having an output, said output being connected to said transmitting unit, wherein, said binary code stored in said storage unit is selectively fed to said first register via said multiplexers and wherein said binary code is fed from said first to said second register where it is converted into a binary code train.

15. A transponder according to claim 14, wherein said binary code is converted into said binary code train in said second register by adding to said binary code a start bit, a parity bit and at least one stop bit.

16. A transponder according to claim 14, wherein said multiplexer unit outputs are connected to said first register via inverters.

17. A transponder according to claim 16, wherein said control circuit further includes a NAND gate connected to said second register, said NAND gate being activated by said clock pulse and by said control circuit when said control circuit is in said active state to empty said binary code train from said second register to said transmitting unit.

18. A transponder according to claim 2, wherein each of said *n* sending units is comprised of a normally opened switch which is closed momentarily by a cam, said cam being driven by a least significant digit wheel in said utility meter, said sending units being connected via time delay networks to said *n* input terminals, wherein said switch normally closes once for each revolution of said least significant digit wheel.

19. A transponder according to claim 18, wherein one shot circuit elements are connected between said time delay networks and said *n* input terminals wherein said sending units activate said one shot circuit element which in turn activates said storage unit.

20. A transponder according to claim 2, wherein each of said *n* sending units is comprised of a light emitting diode and a light sensitive electronic switch, wherein a light beam from said light emitting diode is reflected, via a least significant digit wheel or pointer of said utility meter, once for each revolution of said least significant digit wheel or pointer to thereby activate said light sensitive electronic switch.

21. A transponder according to claim 20, wherein said *n* sending units are connected to said n input terminals via *n* one shot circuit elements.

22. A system for remotely reading utility meters comprising:

a. a centrally located unit comprising:

i. a digital computer having a first storage unit for storing a plurality of binary interrogation code trains, and a second storage unit for receiving binary code trains and a control unit;

ii. an automatic telephone dialing unit, controllable by said control unit;

iii. a first computer/telephone interface, said interface connecting said computer to said automatic dialing unit, said interface also processing codes compatible with said computer into codes compatible with said automatic dialing unit, said interface also processing codes compatible with said automatic dialing unit into codes compatible with said computer;

b. a plurality of remotely located transponders, each transponder being comprised of:

i. a second computer/telephone interface, said second interface connecting said transponder to said computer via a telephone line, a central exchange, said automatic dialing unit and said first interface said second interface adapting codes from said telephone lines for use in said transponder and adapting codes from said transponder for transmission over said telephone line;

ii. a decoder, said decoder being connected to said second interface and being adapted to respond to a particular one of said plurality of binary interrogation codes;

iii. a sending unit associated with at least one utility meter and an encoder connected with said sending unit for producing a parallel code, said code representing a current decimal digit value of said at least one utility meter;

iv. a transmitter, said transmitter being connected to said encoder and also connected to said second computer/telephone interface;

v. a control circuit connected to said decoder, said control circuit switching from a first state to a second state upon receipt of said particular one of said binary interrogation code trains, said control circuit switching from said second state to a third state upon receipt, a second time, of said particular one of said binary interrogation code trains within a predetermined time period, said control circuit switching from said second state to said first state if said particular one of said binary interrogation code trains is not received within said predetermined time period, said control circuit, when in said third state, controlling said transmitter to transmit said parallel code, in a serial manner, from said encoder to said second storage unit of said computer, said control circuit incrementing said sending unit to thereby produce a series of parallel codes each representing a digit value of said at least one utility meter, said control circuit switching from said third state to said first state upon the termination of said transmission.

23. A transponder for transmitting in the form of binary code trains, the current reading of *n* number of utility meters, each meter having *m* number of dials, each dial representing the value of each digit of said current reading, where *m* and *n* are positive integers, said transponder comprising:

a. a sending unit having 10 outputs representing the digit values 0 to 9 of each dial, each dial being selectively interconnected to said 10 outputs;

b. an encoder connected to said 10 outputs for producing a parallel binary code train on four output lines, each parallel code train representing the decimal digit value of one of said $m$ dials of said $n$ utility meters;

c. an incrementing unit connected to said sending unit to sequentially connect each dial to said encoder;

d. a receiving unit for receiving a binary interrogation code from a telephone line and adapting said code for use by said transponder;

e. a decoder connected to said receiving unit which produces an output pulse upon receipt of a particular binary interrogation code;

f. a transmitting unit connected to said four output lines of said encoder, said transmitting unit including a parallel to serial binary code train converter; and g. a control circuit connected to said decoder, said control circuit switching from a standby state to a ready state upon receipt of said output pulse, a first time, said control circuit switching from said ready state to an operating state upon receipt of said output pulse, a second time within a predetermined time period, said control circuit switching from said ready state to said standby state if said pulse is not received within said predetermined time, wherein said control circuit, when in said operating state, controls said transmitting unit to transmit said parallel code train and advances said incrementing unit a total of $mn$ times to thereby sequentially transmit mn binary code trains representing m digit values of $n$ utility meters, said control circuit switching from said operating state to said standby state upon the completion of the transmission of the $m \times n$th code train.

24. A transponder for transmitting, in the form of binary code trains, the current reading of $n$ number of utility meters, said transponder comprising:

a. a plurality of input terminals for connection to said $n$ utility meters;

b. a receiving unit, connected to a telephone line, for receiving a binary interrogation code from said telephone line, said receiving unit adapting said interrogation code for use by said transponder;

c. a decoder connected to said receiving unit, said decoder producing a pulse upon receipt of a particular binary interrogation code;

d. a control circuit connected to said decoder, said control circuit switching to a ready state upon receipt of said output pulse, a first time, said control circuit switching from said ready state to an operating state upon receipt of said output pulse, a second time within a predetermined time period, said control circuit switching from said ready state to said standby state if said output pulse is not received within said predetermined time period;

e. a transmitter unit having an input section connected with said plurality of input terminals and an output section connected with said telephone line; and f. an encoder, controlled by said control circuit when said control circuit is in said operating state to sequentially condition each of said $n$ utility meters to produce, at selected ones of said plurality of input terminals, a plurality of pulse code trains representing the current readings of said $n$ utility meters, said transmitting unit operating on said plurality of pulse code trains to produce, on said telephone line said binary code trains.

25. A transponder according to claim 24, wherein said control circuit, when in said operating state, disables said receiving unit.

26. A transponder according to claim 25, wherein said encoder, upon the completion of sequentially conditioning said $n$ utility meters, switches said control circuit from said operating state to said standby state, thereby enabling said receiving unit for receipt of further binary interrogation codes.

27. A transponder according to claim 24, wherein said control circuit includes a clock pulse generator and wherein clock pulses from said generator control said encoder to sequentially condition said n utility meters.

28. A transponder according to claim 27 wherein said clock pulses control said transmitter unit to sequentially produce said binary code train.

* * * * *